US012656459B2

(12) United States Patent
Li et al.

(10) Patent No.: US 12,656,459 B2
(45) Date of Patent: Jun. 16, 2026

(54) ECHO SIGNAL PROCESSING METHOD AND APPARATUS

(71) Applicant: Yinwang Intelligent Technologies Co., Ltd., Shenzhen (CN)

(72) Inventors: Qiang Li, Beijing (CN); Honglei Li, Beijing (CN); Tong Jiang, Beijing (CN); Hongying Wu, Beijing (CN)

(73) Assignee: YINWANG INTELLIGENT TECHOLOGIES CO., LTD., Shenzhen (CN)

( * ) Notice: Subject to any disclaimer, the term of this patent is extended or adjusted under 35 U.S.C. 154(b) by 1137 days.

(21) Appl. No.: 17/490,200

(22) Filed: Sep. 30, 2021

(65) Prior Publication Data

US 2022/0026532 A1    Jan. 27, 2022

Related U.S. Application Data

(63) Continuation of application No. PCT/CN2019/081517, filed on Apr. 4, 2019.

(51) Int. Cl.
*G06F 11/30* (2006.01)
*G01S 7/48* (2006.01)
(Continued)

(52) U.S. Cl.
CPC ........... *G01S 7/4802* (2013.01); *G01S 7/4811* (2013.01); *G01S 7/4861* (2013.01); *G01S 17/14* (2020.01)

(58) Field of Classification Search
CPC ..................................................... G01S 7/4802
See application file for complete search history.

(56) References Cited

U.S. PATENT DOCUMENTS 4,649,394 A      3/1987   Minker et al.
5,694,435 A  *  12/1997   Kolle ..................... G01S 7/2922
                                                        375/342
(Continued)

FOREIGN PATENT DOCUMENTS

CN        101539623 A      9/2009
CN        103486987 A      1/2014
(Continued)

OTHER PUBLICATIONS

Yoshioka, K., et al., "A 20ch TDC/ADC Hybrid SoC for 240 96-Pixel 10%-Reflection 0.125%-Precision 200m-Range Imaging LiDAR with Smart Accumulation Technique," ISSCC 2018 / SESSION 5 / Image Sensors / 5.7, 2018 IEEE International Solid-State Circuits Conference, 3 pages.

*Primary Examiner* — Phuong Huynh
(74) *Attorney, Agent, or Firm* — Conley Rose, P.C.

(57)    ABSTRACT

An echo signal processing method includes receiving echo signals, in different directions, including a first echo signal and a second echo signal, and the first echo signal and the second echo signal are received, determining a first inflection point from the first echo signal, determining a second inflection point from the second echo signal, determining whether a time difference between a first moment at which the first inflection point is received from the first echo signal and a second moment at which the second inflection point is received from the second echo signal is less than a preset threshold, and combining the first echo signal and the second echo signal when the time difference is less than the preset threshold.

20 Claims, 13 Drawing Sheets

(51) Int. Cl.
  *G01S 7/481*      (2006.01)
  *G01S 7/4861*     (2020.01)
  *G01S 17/14*      (2020.01)

(56)          References Cited

U.S. PATENT DOCUMENTS

|  |  |  |  |
|---|---|---|---|
| 6,518,916 B1 * | 2/2003 | Ashihara | G01S 7/412 342/146 |
| 2009/0091490 A1 * | 4/2009 | Tu | G01S 13/46 342/160 |
| 2009/0190007 A1 | 7/2009 | Oggier et al. | |
| 2010/0223019 A1 | 9/2010 | Griessbaum et al. | |
| 2011/0205104 A1 | 8/2011 | Nakagawa | |
| 2012/0105276 A1 * | 5/2012 | Ryland | G01S 13/9017 342/25 F |
| 2018/0003816 A1 * | 1/2018 | Olson | G01S 13/91 |
| 2019/0146060 A1 * | 5/2019 | Qiu | G01S 7/484 356/5.01 |
| 2020/0292664 A1 | 9/2020 | Wang et al. | |
| 2020/0319319 A1 * | 10/2020 | Nauen | G01S 7/4814 |

FOREIGN PATENT DOCUMENTS

| | | |
|---|---|---|
| CN | 104166135 A | 11/2014 |
| CN | 105549027 A | 5/2016 |
| CN | 106154279 A | 11/2016 |
| CN | 106500671 A | 3/2017 |
| CN | 107272018 A | 10/2017 |
| CN | 107703503 A | 2/2018 |
| CN | 108226907 A | 6/2018 |
| CN | 109073743 A | 12/2018 |
| EP | 3339901 A1 | 6/2018 |
| WO | 2010130286 A1 | 11/2010 |
| WO | 2019011803 A1 | 1/2019 |

* cited by examiner

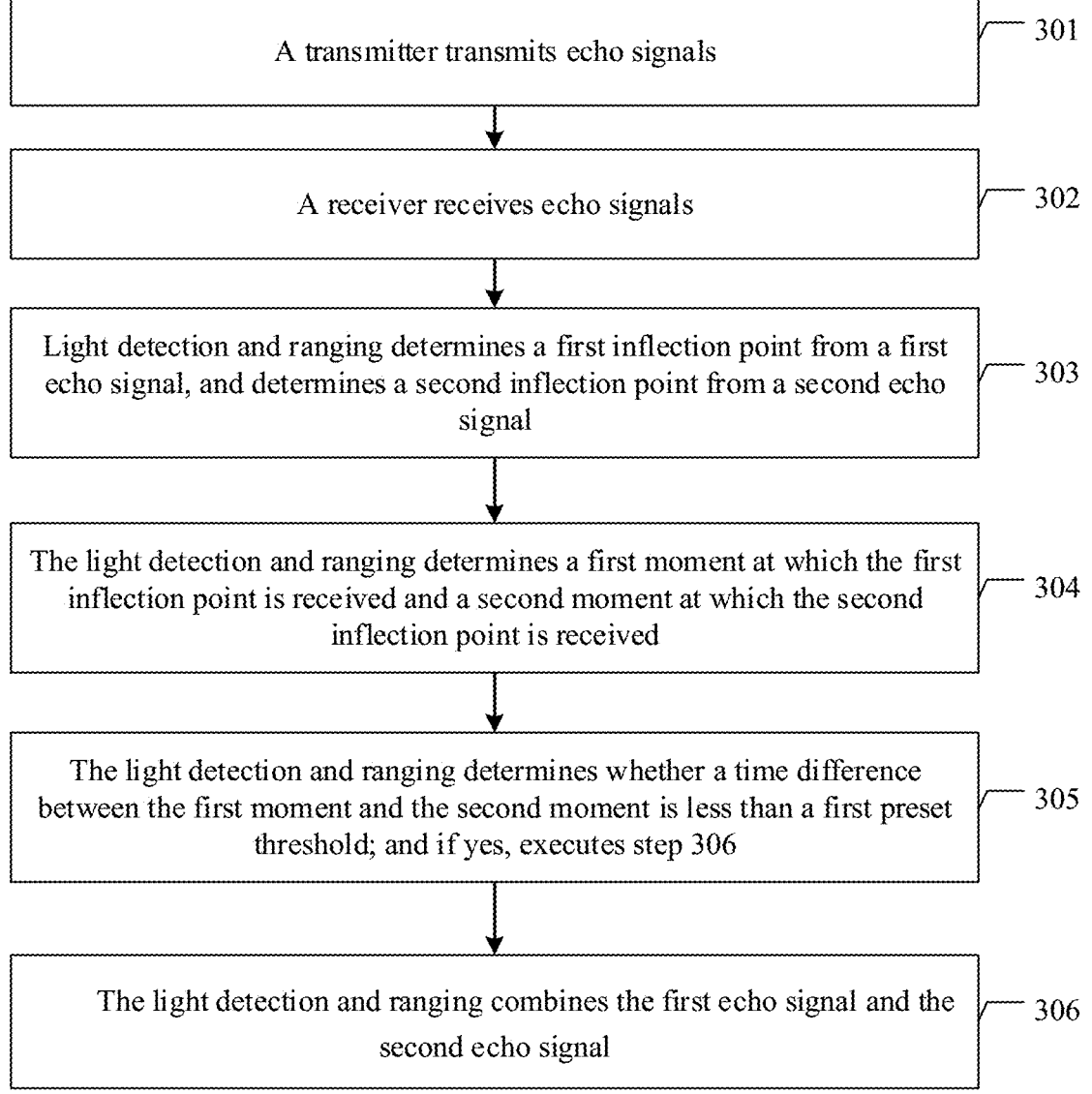

A transmitter transmits echo signals ⟋— 301

A receiver receives echo signals ⟋— 302

Light detection and ranging determines a first inflection point from a first echo signal, and determines a second inflection point from a second echo signal ⟋— 303

The light detection and ranging determines a first moment at which the first inflection point is received and a second moment at which the second inflection point is received ⟋— 304

The light detection and ranging determines whether a time difference between the first moment and the second moment is less than a first preset threshold; and if yes, executes step 306 ⟋— 305

The light detection and ranging combines the first echo signal and the second echo signal ⟋— 306

FIG. 3

Field of view FOV

| | | |
|---|---|---|
| Target area 1 | Target area 2 | Target area 3 |
| Target area 6 | Target area 5 | Target area 4 |

FIG. 7

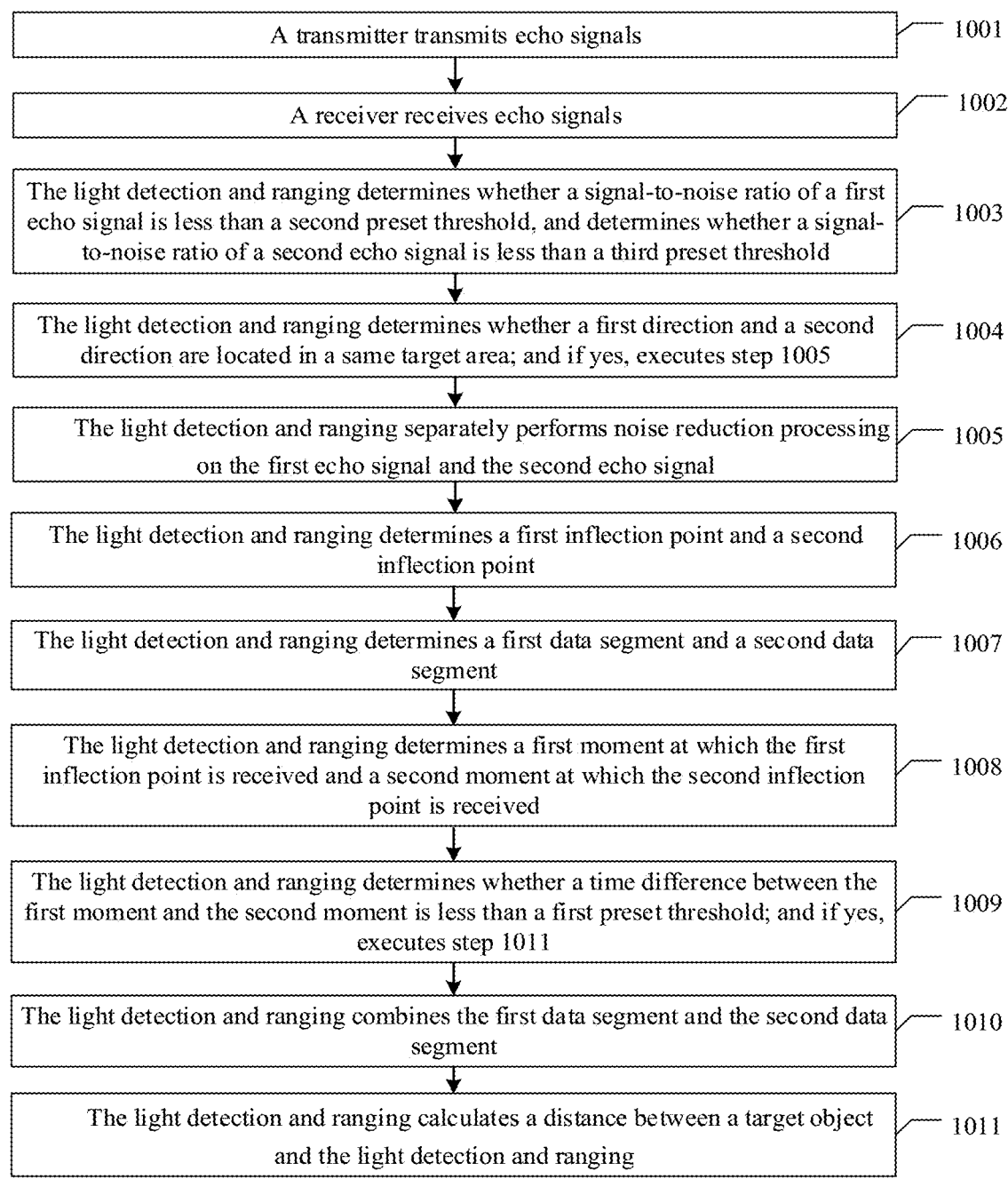

A transmitter transmits echo signals — 1001

A receiver receives echo signals — 1002

The light detection and ranging determines whether a signal-to-noise ratio of a first echo signal is less than a second preset threshold, and determines whether a signal-to-noise ratio of a second echo signal is less than a third preset threshold — 1003

The light detection and ranging determines whether a first direction and a second direction are located in a same target area; and if yes, executes step 1005 — 1004

The light detection and ranging separately performs noise reduction processing on the first echo signal and the second echo signal — 1005

The light detection and ranging determines a first inflection point and a second inflection point — 1006

The light detection and ranging determines a first data segment and a second data segment — 1007

The light detection and ranging determines a first moment at which the first inflection point is received and a second moment at which the second inflection point is received — 1008

The light detection and ranging determines whether a time difference between the first moment and the second moment is less than a first preset threshold; and if yes, executes step 1011 — 1009

The light detection and ranging combines the first data segment and the second data segment — 1010

The light detection and ranging calculates a distance between a target object and the light detection and ranging — 1011

FIG. 10

Target area

First
direction
(X, Y)

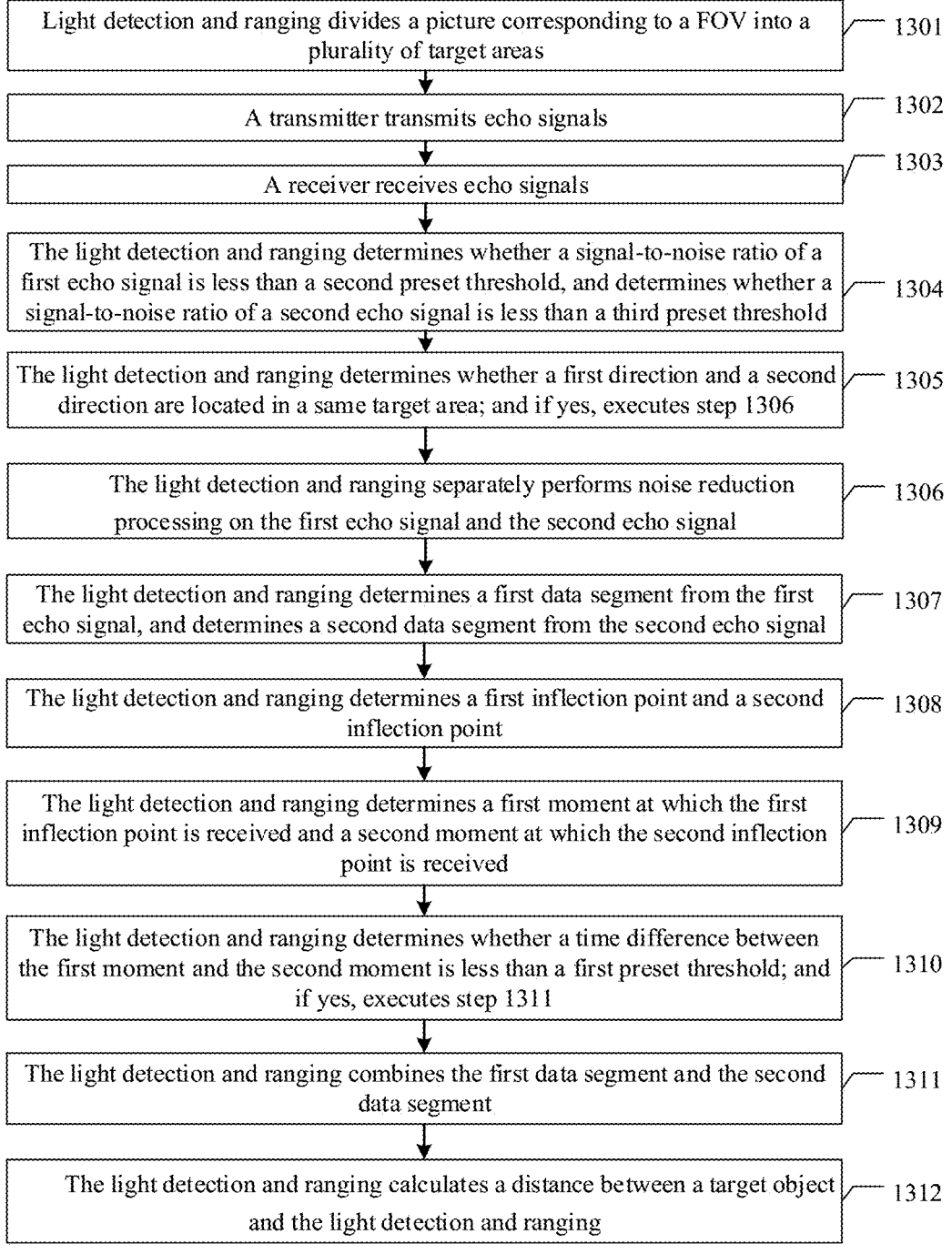

Light detection and ranging divides a picture corresponding to a FOV into a plurality of target areas — 1301

A transmitter transmits echo signals — 1302

A receiver receives echo signals — 1303

The light detection and ranging determines whether a signal-to-noise ratio of a first echo signal is less than a second preset threshold, and determines whether a signal-to-noise ratio of a second echo signal is less than a third preset threshold — 1304

The light detection and ranging determines whether a first direction and a second direction are located in a same target area; and if yes, executes step 1306 — 1305

The light detection and ranging separately performs noise reduction processing on the first echo signal and the second echo signal — 1306

The light detection and ranging determines a first data segment from the first echo signal, and determines a second data segment from the second echo signal — 1307

The light detection and ranging determines a first inflection point and a second inflection point — 1308

The light detection and ranging determines a first moment at which the first inflection point is received and a second moment at which the second inflection point is received — 1309

The light detection and ranging determines whether a time difference between the first moment and the second moment is less than a first preset threshold; and if yes, executes step 1311 — 1310

The light detection and ranging combines the first data segment and the second data segment — 1311

The light detection and ranging calculates a distance between a target object and the light detection and ranging — 1312

FIG. 13

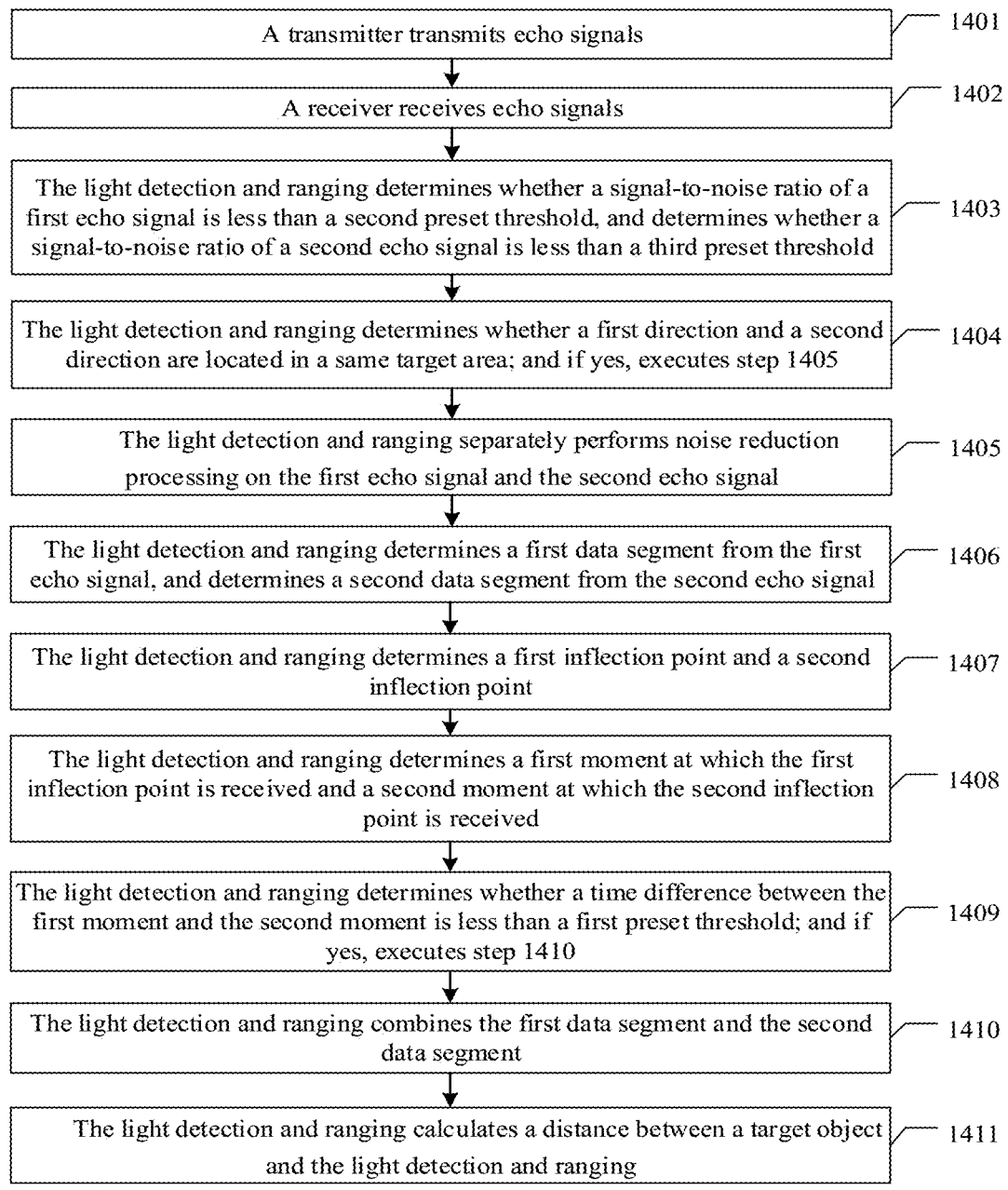

A transmitter transmits echo signals — 1401

A receiver receives echo signals — 1402

The light detection and ranging determines whether a signal-to-noise ratio of a first echo signal is less than a second preset threshold, and determines whether a signal-to-noise ratio of a second echo signal is less than a third preset threshold — 1403

The light detection and ranging determines whether a first direction and a second direction are located in a same target area; and if yes, executes step 1405 — 1404

The light detection and ranging separately performs noise reduction processing on the first echo signal and the second echo signal — 1405

The light detection and ranging determines a first data segment from the first echo signal, and determines a second data segment from the second echo signal — 1406

The light detection and ranging determines a first inflection point and a second inflection point — 1407

The light detection and ranging determines a first moment at which the first inflection point is received and a second moment at which the second inflection point is received — 1408

The light detection and ranging determines whether a time difference between the first moment and the second moment is less than a first preset threshold; and if yes, executes step 1410 — 1409

The light detection and ranging combines the first data segment and the second data segment — 1410

The light detection and ranging calculates a distance between a target object and the light detection and ranging — 1411

FIG. 14

Echo signal processing apparatus 150

ECHO SIGNAL PROCESSING METHOD AND APPARATUS

CROSS-REFERENCE TO RELATED APPLICATIONS

This is a continuation of International Patent Application No. PCT/CN2019/081517 filed on Apr. 4, 2019, which is hereby incorporated by reference in its entirety.

TECHNICAL FIELD

Embodiments of this application relate to the field of communications technologies, and in particular, to an echo signal processing method and apparatus.

BACKGROUND

Light detection and ranging is an optical remote sensing technology. The light detection and ranging may be applied to fields such as intelligent transportation, self-driving, atmospheric environment monitoring, geographical mapping, and an unmanned aerial vehicle. A working principle of the light detection and ranging is that a transmitter transmits a laser pulse to a target object, and a receiver receives an echo signal reflected by the target object and completes functions such as ranging, target detection, tracking, and imaging recognition by using the echo signal.

When a signal-to-noise ratio of an echo signal received by a receiver is relatively low due to a relatively far target object or a relatively poor transmission condition, light detection and ranging may combine echo signals of different pixels to improve the signal-to-noise ratio of the echo signal.

However, when the echo signals combined by the light detection and ranging are not echo signals from a same target object, the signal-to-noise ratio of the echo signal cannot be improved, and noise is introduced, and consequently the signal-to-noise ratio of the echo signal is reduced.

SUMMARY

Embodiments of this application provide an echo signal processing method and apparatus, to combine a first echo signal and a second echo signal when a time difference between a first moment at which a first inflection point is received from the first echo signal and a second moment at which a second inflection point is received from the second echo signal is less than a first preset threshold, thereby improving a signal-to-noise ratio of a signal obtained after the first echo signal and the second echo signal are combined.

A first aspect of the embodiments of this application provides an echo signal processing method, including receiving at least two echo signals, where the at least two echo signals include a first echo signal and a second echo signal, and the first echo signal and the second echo signal are received in different directions, determining a first inflection point from the first echo signal, and determining a second inflection point from the second echo signal, where the first inflection point is a sampling point of the first echo signal, and amplitude values of left and right neighboring sampling points are less than an amplitude value of the first inflection point, and the second inflection point is a sampling point of the second echo signal, and amplitude values of left and right neighboring sampling point are less than an amplitude value of the second inflection point, determining whether a time difference between a first moment at which the first inflection point is received from the first echo signal and a second moment at which the second inflection point is received from the second echo signal is less than a first preset threshold, and if yes, combining the first echo signal and the second echo signal. It can be learned from the first aspect that, when the time difference between the first moment at which the first inflection point is received and the second moment at which the second inflection point is received is less than the first preset threshold, it indicates that a difference between duration of the first echo signal and duration of the second echo signal is relatively small. Therefore, it can be determined that the first echo signal and the second echo signal are reflected by a same target object, and a signal-to-noise ratio of a signal can be improved by combining the first echo signal and the second echo signal that are reflected by the same target object.

Based on the first aspect of the embodiments of this application, in a first implementation of the first aspect of the embodiments of this application, the method further includes determining a first data segment from the first echo signal, and determining a second data segment from the second echo signal, where the first inflection point is included in the first data segment, and the second inflection point is included in the second data segment, and combining the first echo signal and the second echo signal includes combining the first data segment and the second data segment. It can be learned from the first implementation of the first aspect that, in this embodiment, the first data segment that includes the first inflection point and the second data segment that includes the second inflection point are combined, thereby improving a signal-to-noise ratio of a signal obtained after the first data segment and the second data segment are combined.

Based on the first aspect of the embodiments of this application and the first implementation of the first aspect of the embodiments of this application, in a second implementation of the first aspect of the embodiments of this application, determining a first data segment from the first echo signal includes determining, as the first data segment, a set of the first inflection point and P sampling points adjacent to the first inflection point, where P is an integer greater than or equal to 1, and determining a second data segment from the second echo signal includes determining, as the second data segment, a set of the second inflection point and P sampling points adjacent to the second inflection point. It can be learned from the second implementation of the first aspect that, this embodiment provides a manner of determining the first data segment and the second data segment, thereby improving feasibility of the solution.

Based on the first aspect of the embodiments of this application, the first implementation of the first aspect of the embodiments of this application, and the second implementation of the first aspect of the embodiments of this application, in a third implementation of the first aspect of the embodiments of this application, determining a first inflection point from the first echo signal includes determining a first inflection point set from the first echo signal, where the first inflection point is any one of the first N inflection points in the first inflection point set, the first inflection point set is a set of all inflection points of the first echo signal, and the inflection points in the first inflection point set are sorted in descending order based on amplitude values, and determining a second inflection point from the second echo signal includes determining a second inflection point set from the second echo signal, where the second inflection point is any one of the first N inflection points in the second inflection point set, the second inflection point set is a set of all inflection points of the second echo signal, and the inflection points in the second inflection point set are sorted in descending order based on amplitude values. It can be learned from the third implementation of the first aspect that, inflection points with relatively large amplitude values are used as the first inflection point and the second inflection point, thereby improving accuracy of calculating time of flight of the target object.

Based on the first aspect of the embodiments of this application and the first implementation of the first aspect of the embodiments of this application to the third implementation of the first aspect of the embodiments of this application, in a fourth implementation of the first aspect of the embodiments of this application, determining a first data segment from the first echo signal includes truncating M data segments from the first echo signal to obtain a first data segment set, where the first data segment is the first Z data segments in the first data segment set, the M data segments truncated from the first echo signal are sorted in the first data segment set in descending order based on energy values of the data segments, and M and Z are both integers greater than or equal to 1, and determining a second data segment from the second echo signal includes truncating M data segments from the second echo signal to obtain a second data segment set, where the second data segment is the first Z data segments in the second data segment set, and the M data segments truncated from the second echo signal are sorted in the second data segment set in descending order based on energy values of the data segments. It can be learned from the fourth implementation of the first aspect that, a data segment with a relatively large energy value is determined from the first echo signal as the first data segment, and a data segment with a relatively large energy value is determined from the second echo signal as the second data segment, thereby improving accuracy of calculating time of flight of the target object.

Based on the first aspect of the embodiments of this application and the first implementation of the first aspect of the embodiments of this application to the fourth implementation of the first aspect of the embodiments of this application, in a fifth implementation of the first aspect of the embodiments of this application, before determining whether a time difference between a first moment at which the first inflection point is received from the first echo signal and a second moment at which the second inflection point is received from the second echo signal is less than a first preset threshold, the method further includes determining that a first direction in which the first echo signal is received and a second direction in which the second echo signal is received are located in a same target area, and if yes, determining whether the time difference between the first moment at which the first inflection point is received from the first echo signal and the second moment at which the second inflection point is received from the second echo signal is less than the first preset threshold. It can be learned from the fifth implementation of the first aspect that, the first moment of the first inflection point of the first echo signal and the second moment of the second inflection point of the second echo signal in a same target area are determined, thereby increasing a probability that the first echo signal and the second echo signal are reflected by a same target object.

Based on the first aspect of the embodiments of this application and the first implementation of the first aspect of the embodiments of this application to the fifth implementation of the first aspect of the embodiments of this application, in a sixth implementation of the first aspect of the embodiments of this application, before determining that a first direction in which the first echo signal is received and a second direction in which the second echo signal is received are located in a same target area, the method further includes dividing a field of view (FOV) corresponding to receiving the at least one echo signal into a plurality of target areas, where the FOV includes the target object. It can be learned from the sixth implementation of the first aspect that, target area division are performed in advance, thereby increasing a probability that the first echo signal and the second echo signal in a same target area are reflected by a same target object.

Based on the first aspect of the embodiments of this application and the first implementation of the first aspect of the embodiments of this application to the sixth implementation of the first aspect of the embodiments of this application, in a seventh implementation of the first aspect of the embodiments of this application, before determining that a first direction in which the first echo signal is received and a second direction in which the second echo signal is received are located in a same target area, the method further includes determining, as the target area, the first direction in which the first echo signal is received and a neighboring area of the first direction in which the first echo signal is received. It can be learned from the seventh implementation of the first aspect that, the first direction and the neighboring area of the first direction are used as the target area, to improve accuracy of the target area, thereby increasing a probability that the first echo signal and the second echo signal in a same target area are reflected by a same target object.

Based on the first aspect of the embodiments of this application and the first implementation of the first aspect of the embodiments of this application to the seventh implementation of the first aspect of the embodiments of this application, in an eighth implementation of the first aspect of the embodiments of this application, the method further includes determining a sampling point with a largest amplitude value from a signal obtained after the first echo signal and the second echo signal are combined, and determining a third moment corresponding to the sampling point with the largest amplitude value, and calculating, based on the third moment, a distance between the target object and a receive point that receives the first echo signal. It can be learned from the eighth implementation of the first aspect that, the distance is calculated by using the sampling point with the largest amplitude value in the signal obtained after the first echo signal and the second echo signal are combined, thereby improving accuracy of calculating the distance between the target object and the receive point that receives the first echo signal.

Based on the first aspect of the embodiments of this application and the first implementation of the first aspect of the embodiments of this application to the eighth implementation of the first aspect of the embodiments of this application, in a ninth implementation of the first aspect of the embodiments of this application, a signal-to-noise ratio of the first echo signal is less than a second preset threshold, and a signal-to-noise ratio of the second echo signal is less than a third preset threshold. It can be learned from the ninth implementation of the first aspect that, when the signal-to-noise ratio of the first echo signal and the signal-to-noise ratio of the second echo signal are relatively low, the first echo signal and the second echo signal are combined, thereby improving a signal-to-noise ratio of the signal obtained after the first echo signal and the second echo signal are combined.

Based on the first aspect of the embodiments of this application and the first implementation of the first aspect of the embodiments of this application to the ninth implementation of the first aspect of the embodiments of this application, in a tenth implementation of the first aspect of the embodiments of this application, the method further includes separately performing noise reduction processing on the first echo signal and the second echo signal, where the noise reduction processing includes at least one of matched filtering, Gaussian filtering, wavelet domain denoising, and frequency domain filtering. It can be learned from the tenth implementation of the first aspect that, noise reduction processing is performed on the first echo signal and the second echo signal, thereby improving the signal-to-noise ratio of the signal obtained after the first echo signal and the second echo signal are combined.

A second aspect of the embodiments of this application provides an echo signal processing apparatus. The echo signal processing apparatus has a function of implementing any one of the first aspect or the possible implementations of the first aspect. The function may be implemented by using hardware, or may be implemented by executing corresponding software by using hardware, or may be implemented in a form of a combination of software and hardware. The hardware and/or software include/includes one or more modules corresponding to the function.

A third aspect of the embodiments of this application provides an echo signal processing apparatus. The echo signal processing apparatus includes a processor. The processor is coupled to a memory. The memory is configured to store a program or instructions. When the program or the instructions is/are executed by the processor, the echo signal processing apparatus is enabled to execute the processing or operation in any one of the first aspect or the possible implementations of the first aspect.

A fourth aspect of the embodiments of this application provides a storage medium. The storage medium stores a computer program or instructions. When the computer program or the instructions is/are executed, a computer is enabled to execute the method in any one of the first aspect or the possible implementations of the first aspect.

A fifth aspect of the embodiments of this application provides a computer program product that includes instructions. When the computer program product runs on a computer, the computer is enabled to execute the method in any one of the first aspect or the possible implementations of the first aspect.

A sixth aspect of the embodiments of this application provides a chip system. The chip system includes at least one processor and a communications interface, and the chip system may further include a memory. The memory, the communications interface, and the at least one processor are interconnected by using a line. The at least one memory stores instructions. The instructions are executed by the at least one processor to execute the method in any one of the first aspect or the possible implementations of the first aspect.

In the embodiments, light detection and ranging determines the first inflection point from the first echo signal, and determines the second inflection point from the second echo signal, and when determining that the time difference between the first moment at which the first inflection point is received and the second moment at which the second inflection point is received is less than the first preset threshold, the light detection and ranging combines the first echo signal and the second echo signal. Clearly, when the time difference between the first moment at which the first inflection point is received and the second moment at which the second inflection point is received is less than the first preset threshold, the light detection and ranging can determine that the received first echo signal and second echo signal are reflected by a same target object, and the signal-to-noise ratio of the combined signal can be improved by combining the first echo signal and the second echo signal that are reflected by the same target object.

BRIEF DESCRIPTION OF DRAWINGS

FIG. 3 is a schematic block diagram of an echo signal processing method according to an embodiment of this application;

FIG. 7 is a schematic diagram of another embodiment according to an embodiment of this application;

FIG. 10 is a schematic block diagram of another echo signal processing method according to an embodiment of this application;

FIG. 13 is a schematic block diagram of another echo signal processing method according to an embodiment of this application;

FIG. 14 is a schematic block diagram of another echo signal processing method according to an embodiment of this application;

DESCRIPTION OF EMBODIMENTS

The following clearly describes the technical solutions in the embodiments of this application with reference to the accompanying drawings in the embodiments of this application. Clearly, the described embodiments are merely some but not all of the embodiments of this application.

In the specification, claims, and accompanying drawings of this application, the terms "first", "second", "third", "fourth", and the like (if existent) are intended to distinguish between similar objects but are not necessarily intended to indicate a specific order or sequence. It should be understood that the data termed in such a way is interchangeable in proper circumstances so that the embodiments described herein can be implemented in an order other than the order illustrated or described herein. Moreover, the terms "include", "comprise", and any other variants thereof are intended to cover the non-exclusive inclusion, for example, a process, method, system, product, or device that includes a list of steps or units is not necessarily limited to those steps or units expressly listed, but may include other steps or units not expressly listed or inherent to such a process, method, system, product, or device.

The embodiments of this application provide an echo signal processing method and apparatus, to combine a first echo signal and a second echo signal when a time difference between a first moment at which a first inflection point is received from the first echo signal and a second moment at which a second inflection point is received from the second echo signal is less than a first preset threshold, thereby improving a signal-to-noise ratio of a signal obtained after the first echo signal and the second echo signal are combined.

Figure 1:
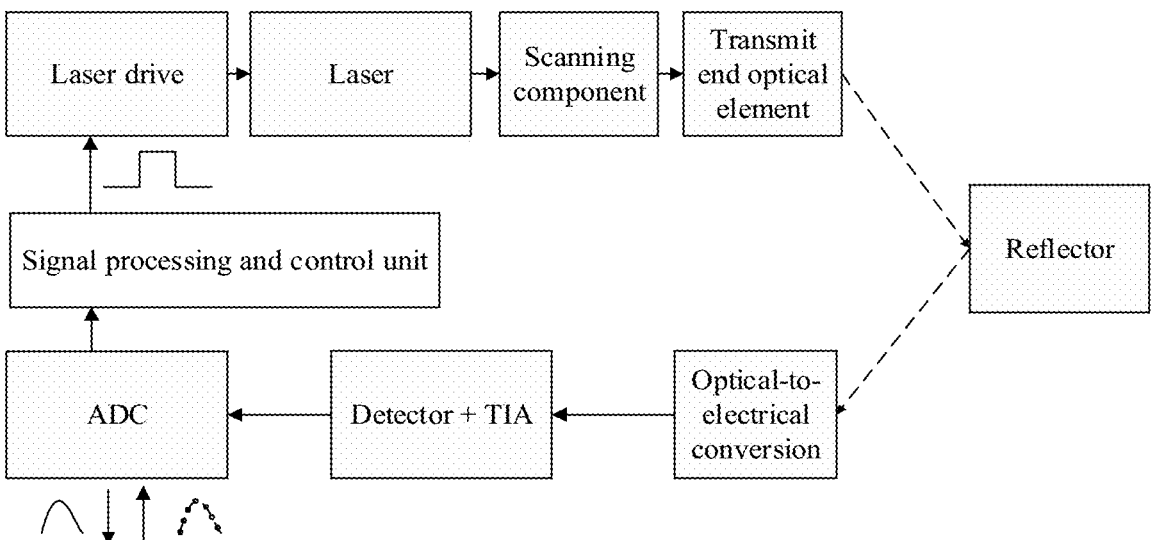
FIG. 1 is a schematic diagram of an embodiment according to an embodiment of this application.

FIG. 1 is a block diagram of a system architecture of light detection and ranging (LIDAR) according to an embodiment of this application. As shown in FIG. 1, a signal processing and control unit sends a pulse signal to a laser drive circuit, the laser drive circuit modulates the pulse signal to a laser, the laser transmits an echo signal with a pulse, and a scanning component and a transmit end optical element scan and shape a beam, after a receive end optical element performs focus shaping on a received echo signal, a detector receives the echo signal and converts the echo signal into a current signal, and a transimpedance amplifier (TIA) may amplify the current signal into a voltage signal, and an analog-to-digital converter (ADC) may convert the analog voltage signal into a digital signal. In this embodiment of this application, an echo signal obtained after the ADC performs sampling is processed to calculate a moment of flight and a distance from a target object.

Figure 2:
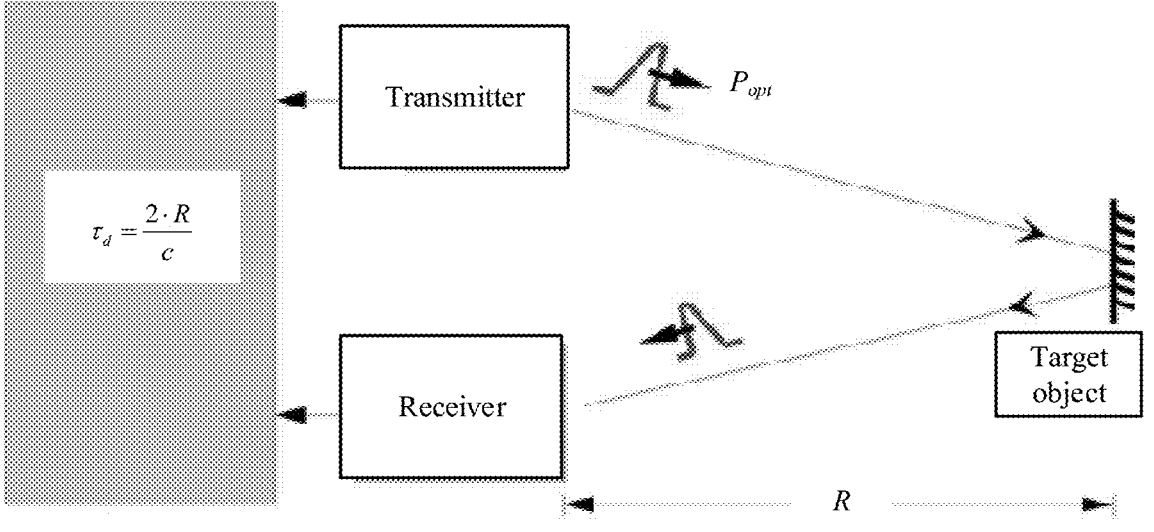
FIG. 2 is a schematic diagram of another embodiment according to an embodiment of this application.

FIG. 2 is a schematic diagram of an application scenario according to an embodiment of this application. As shown in FIG. 2, light detection and ranging includes a transmitter and a receiver, the transmitter is configured to transmit an echo signal, and the receiver is configured to receive an echo signal. The light detection and ranging measures a time difference (time of flight (TOF)) between a receive moment and a transmit moment of the echo signal, and completes distance measurement based on the TOF and a speed of light c. Further, a basic distance measurement process of the light detection and ranging may be shown in FIG. 2. For example, a distance between the light detection and ranging and a target object may be calculated by using formula (2-1):

$$R = \frac{ct}{2}(2-1).$$

In formula (2-1), R is the distance between the light detection and ranging and the target object, c is the speed of light, and t is the TOF of the echo signal.

The foregoing describes the system architecture and the application scenario provided in the embodiments of this application, and the following describes an echo signal processing method provided in the embodiments of this application.

FIG. 3 is a schematic block diagram of an echo signal processing method according to an embodiment of this application. As shown in FIG. 3, the echo signal processing method may include the following steps.

301: A transmitter transmits echo signals.

Light detection and ranging scans an FOV of the light detection and ranging, and transmits at least two echo signals within the FOV by using the transmitter. The at least two echo signals include at least a first echo signal and a second echo signal. This embodiment and subsequent embodiments provide descriptions by using only an example in which the first echo signal and the second echo signal are used as the at least two echo signals.

It should be noted that, in this embodiment, the at least two echo signals transmitted by the transmitter are transmitted in different directions within the FOV. For example, the transmitter transmits the first echo signal in a first direction (x, y), and transmits the second echo signal in a second direction (x, y+1).

Figure 4:
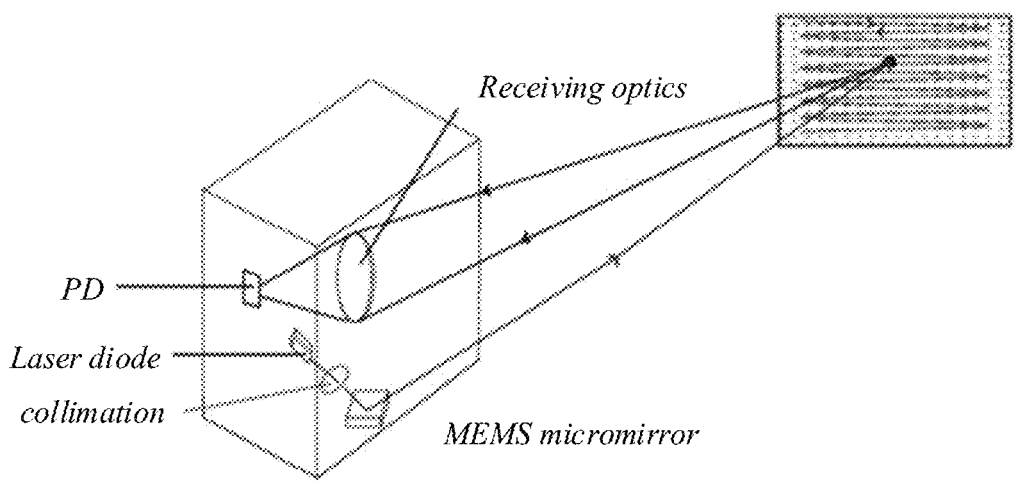
FIG. 4 is a schematic diagram of another embodiment according to an embodiment of this application.

For details, refer to FIG. 4. FIG. 4 is a schematic diagram in which a transmitter transmits echo signals within an FOV. As shown in FIG. 4, the transmitter transmits echo signals in different directions within the FOV through rotation of a microelectromechanical systems (MEMS) micromirror.

302: A receiver receives echo signals.

The transmitter of the light detection and ranging transmits the echo signals within the FOV, the echo signals are reflected by an object within the FOV, and the receiver receives echo signals reflected by the object within the FOV. The received echo signals include a first echo signal and a second echo signal.

303: The light detection and ranging determines a first inflection point from the first echo signal, and determines a second inflection point from the second echo signal.

The light detection and ranging separately receives the first echo signal and the second echo signal, and determines the first inflection point from the first echo signal, and determines the second inflection point from the second echo signal.

Figure 5:
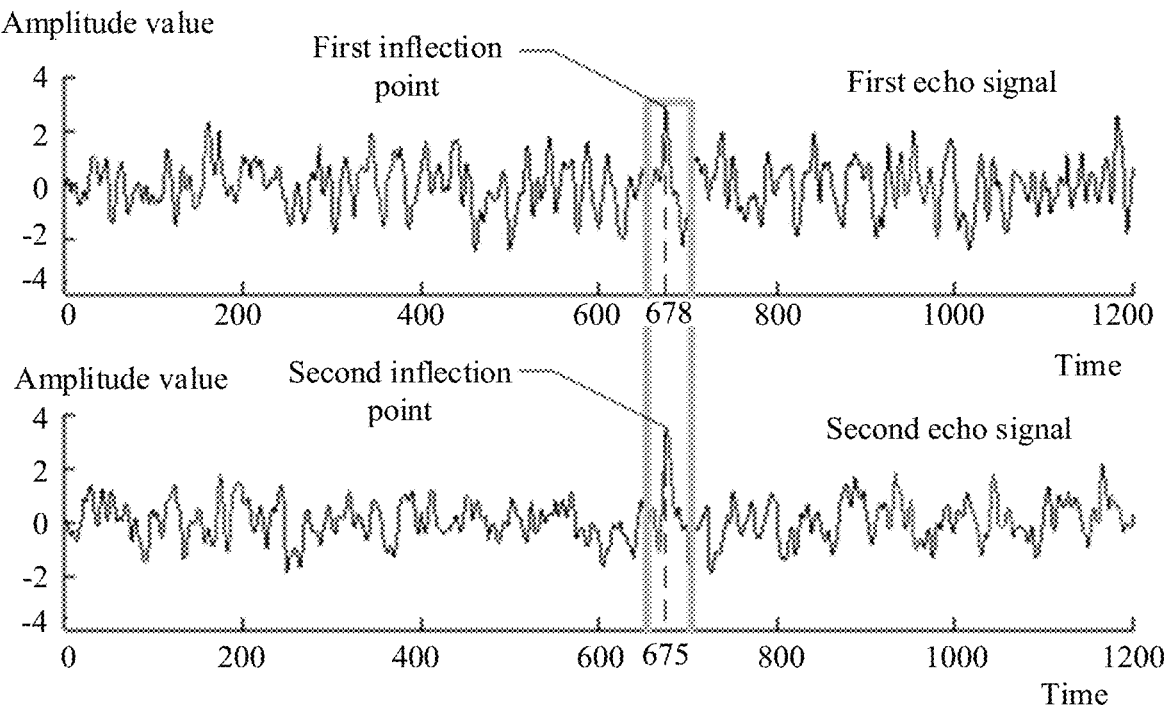
FIG. 5 is a schematic diagram of another embodiment according to an embodiment of this application.

For details, refer to FIG. 5. The first echo signal received by the light detection and ranging in the first direction (x, y) and the second echo signal received by the light detection and ranging in the second direction (x, y+1) may be shown in FIG. 5. The light detection and ranging determines the first inflection point from the first echo signal. The first inflection point may be shown in FIG. 5. The first inflection point is used as a sampling point of the first echo signal, and amplitude values of left and right neighboring sampling points of the first inflection point are both less than an amplitude value of the first inflection point.

Certainly, for determining the second inflection point by the light detection and ranging from the second echo signal, also refer to FIG. 5. The second inflection point is a sampling point of the second echo signal, and amplitude values of left and right neighboring sampling points of the second inflection point are both less than an amplitude value of the second inflection point.

304: The light detection and ranging determines a first moment $t_{(x,y)}$ at which the first inflection point is received and a second moment $t_{(x,y+1)}$ at which the second inflection point is received.

Sampling points of the first echo signal are received by the light detection and ranging at different moments. After the light detection and ranging determines the first inflection point, the light detection and ranging may determine the first moment $t_{(x,y)}$ at which the first inflection point is received from the first echo signal. For example, as shown in FIG. 5, the light detection and ranging determines that the first moment $t_{(x,y)}$ at which the first inflection point is received is 678.

Likewise, the light detection and ranging may also determine the second moment $t_{(x,y+1)}$ at which the second inflection point is received from the second echo signal. For example, as shown in FIG. 5, the light detection and ranging determines that the second moment $t_{(x,y+1)}$ at which the first inflection point is received is 675.

It may be understood that the first moment 678 and the second moment 675 provided in this embodiment are merely used as an example, and other values may be alternatively used in actual application.

305: The light detection and ranging determines whether a time difference between the first moment $t_{(x,y)}$ and the second moment $t_{(x,y+1)}$ is less than a first preset threshold, and if yes, executes step 306.

In this embodiment, the light detection and ranging may determine, by using formula (3-1), whether the time difference between the first moment $t_{(x,y)}$ and the second moment $t_{(x,y+1)}$ is less than the first preset threshold:

$$|t_{(x,y)} - t_{(x,y+1)}| \leq thr. \tag{3-1}$$

In formula (3-1), thr is the first preset threshold.

For example, when the light detection and ranging determines that the first moment $t_{(x,y)}$ is 678 and the second moment $t_{(x,y+1)}$ is 675, the light detection and ranging may determine, by using formula (3-1), that the time difference between the first moment $t_{(x,y)}$ and the second moment $t_{(x,y+1)}$ is 2, and when the first preset threshold thr is greater than 2, the time difference between the first moment $t_{(x,y)}$ and the second moment $t_{(x,y+1)}$ is less than the first preset threshold, otherwise, the time difference between the first moment $t_{(x,y)}$ and the second moment $t_{(x,y+1)}$ is greater than or equal to the first preset threshold.

306: The light detection and ranging combines the first echo signal and the second echo signal.

When the time difference between the first moment $t_{(x,y)}$ and the second moment $t_{(x,y+1)}$ is less than or equal to the first preset threshold, the light detection and ranging combines the first echo signal and the second echo signal. For example, when the first preset threshold is 3, the first moment $t_{(x,y)}$ is 678, and the second moment $t_{(x,y+1)}$ is 675, the light detection and ranging combines the first echo signal and the second echo signal.

The following uses an example to describe the combining, by the light detection and ranging, the first echo signal and the second echo signal.

Referring to FIG. 5, the light detection and ranging determines amplitude values of sampling points of the first echo signal and amplitude values of sampling points of the second echo signal, for example, determines amplitude values of sampling points 0 to 1200 of the first echo signal, where the amplitude value of the first inflection point corresponding to a sampling point 678 is 3 and an amplitude value of a sampling point 675 is 2.9. The light detection and ranging may further determine amplitude values of sampling points 0 to 1200 of the second echo signal, where the amplitude value of the second inflection point corresponding to a sampling point 675 is determined as 2.9 and an amplitude value corresponding to a sampling point 678 is determined as 2.8. It should be noted that the amplitude value in this embodiment may be an amplitude value of a level signal. A sampling point 1 corresponds to a sampling time 1, a sampling point 2 corresponds to a sampling time 2, and so on.

Combining, by the light detection and ranging, the first echo signal and the second echo signal may mean combining amplitude values respectively corresponding to a sampling point S of the first echo signal and a sampling point S of the second echo signal. For example, the amplitude value 3 of the sampling point 678 of the first echo signal and the amplitude value 2.8 of the sampling point 678 of the second echo signal are added to obtain an amplitude value 5.8. Certainly, other sampling points may be alternatively added. Details are not described herein. Certainly, in this embodiment, the amplitude value of the first inflection point and the amplitude value of the second inflection point may be alternatively added. For example, the amplitude value 3 of the sampling point 678 of the first inflection point and the amplitude value 2.9 of the sampling point 675 of the second inflection point are added to obtain an amplitude value 5.9. Certainly, when the first inflection point and the second inflection point are added, other sampling points are also added after being offset relative to a sampling distance d between the first inflection point and the second inflection point. For example, if the distance d between the sampling point of the first inflection point and the sampling point of the second inflection point is 2, an amplitude value of a sampling point S of the first echo signal and an amplitude value of a sampling point S+2 of the second echo signal are added.

In this implementation, after combining the amplitude values of the sampling points of the first echo signal and the amplitude values of the sampling points of the second echo signal, the light detection and ranging determines a sampling point with a largest amplitude value from a combined signal, determines TOF of a target object by using a sampling time of the sampling point with the largest amplitude value, and calculates a distance between the target object and the light detection and ranging based on the TOF, or calculates a reflectivity and an amplitude based on the combined signal, or the like.

It may be understood that, when the time difference between the first moment $t_{(x,y)}$ and the second moment $t_{(x,y+1)}$ is greater than the first preset threshold in this embodiment, the light detection and ranging does not combine the first echo signal and the second echo signal in this embodiment.

In this embodiment, the light detection and ranging determines the first inflection point from the first echo signal, and determines the second inflection point from the second echo signal, and when determining that the time difference between the first moment at which the first inflection point is received and the second moment at which the second inflection point is received is less than the first preset threshold, the light detection and ranging combines the first echo signal and the second echo signal. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of the combined signal can be improved by combining the first echo signal and the second echo signal that are reflected by the same target object.

The foregoing describes the echo signal processing method provided in the embodiments of this application, and the following describes another echo signal processing method provided in the embodiments of this application.

Figure 6:
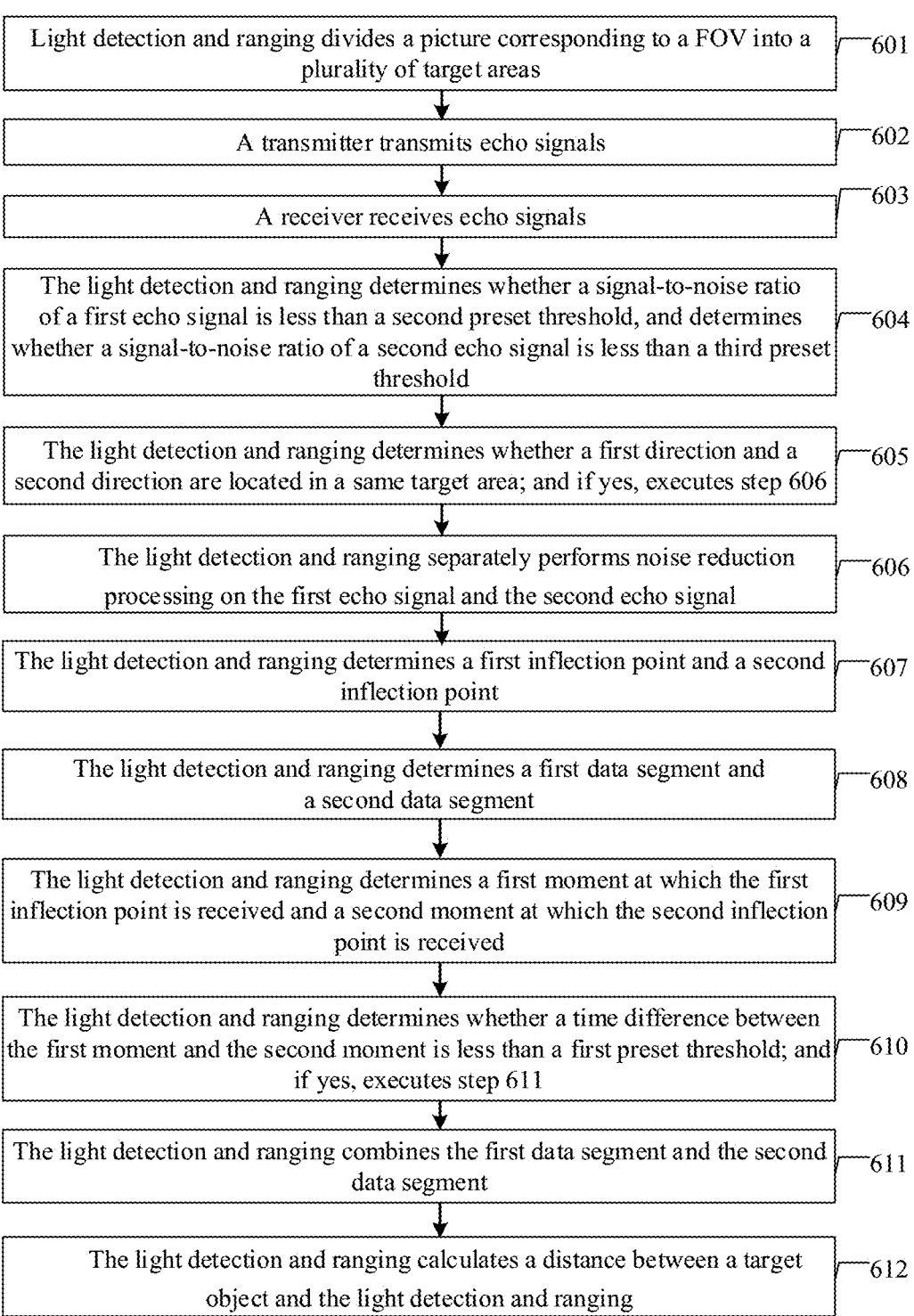
FIG. 6 is a schematic block diagram of another echo signal processing method according to an embodiment of this application.

FIG. 6 is a schematic block diagram of another echo signal processing method according to an embodiment of this application. As shown in FIG. 6, the echo signal processing method may include the following steps.

601: Light detection and ranging divides a picture corresponding to a FOV into a plurality of target areas.

The light detection and ranging scans the FOV of the light detection and ranging and divides the FOV into the plurality of target areas. The FOV includes the target object.

Figure 11:
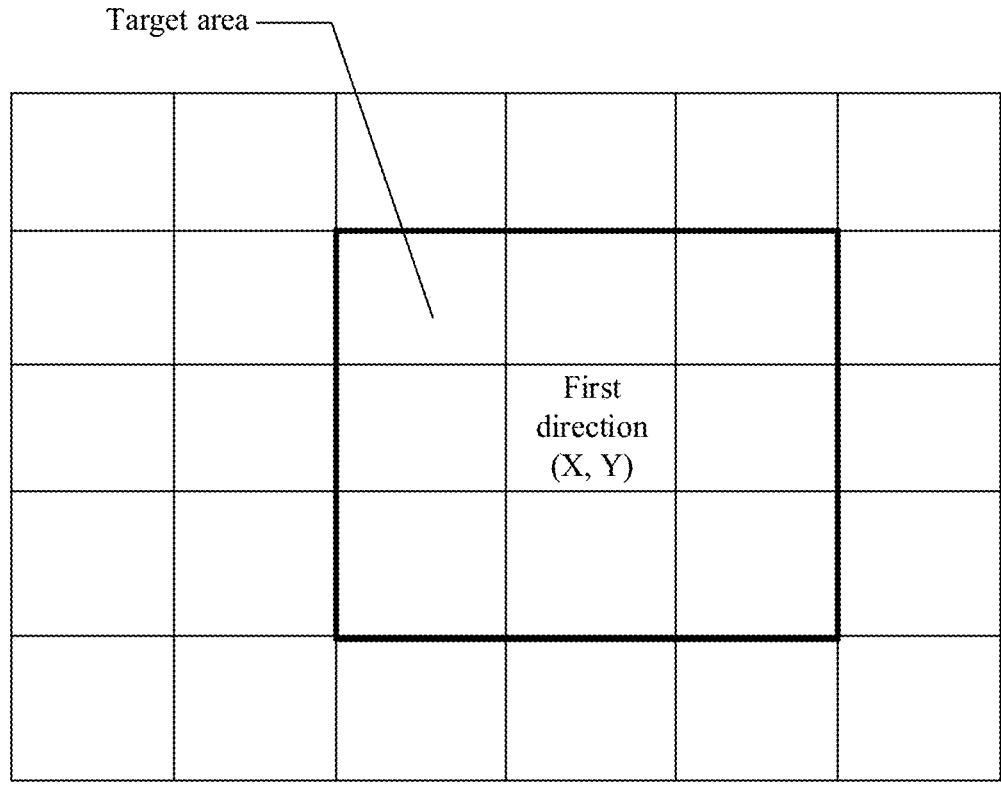
FIG. 11 is a schematic diagram of another embodiment according to an embodiment of this application.

For example, refer to FIG. 7. FIG. 7 is a schematic diagram of target area division according to an embodiment of this application. The light detection and ranging divides the scanned FOV into the plurality of target areas. As shown in FIG. 11, the light detection and ranging may divide the FOV into six target areas, including a target area 1 to a target area 6. Certainly, the light detection and ranging may alternatively divide the FOV into target areas of another quantity. This is not limited herein.

602: A transmitter transmits echo signals.

603: A receiver receives echo signals.

In this embodiment, step 602 and step 603 are similar to step 301 and step 302 in the embodiment corresponding to FIG. 3. Details are not described herein again.

604: The light detection and ranging determines whether a signal-to-noise ratio of a first echo signal is less than a second preset threshold, and determines whether a signal-to-noise ratio of a second echo signal is less than a third preset threshold.

The light detection and ranging determines the signal-to-noise ratio of the first echo signal and the signal-to-noise ratio of the second echo signal. When the signal-to-noise ratio of the first echo signal is less than the second preset threshold and/or the signal-to-noise ratio of the second echo signal is less than the third preset threshold, the light detection and ranging executes step 605.

In this embodiment, when the signal-to-noise ratio of the first echo signal and the signal-to-noise ratio of the second echo signal are relatively low, the light detection and ranging determines whether the first echo signal and the second echo signal can be combined. When the first echo signal and the second echo signal can be combined, a signal-to-noise ratio of a combined signal is improved. When the first echo signal and the second echo signal cannot be combined, the signal-to-noise ratios of the echo signals are not reduced. When the signal-to-noise ratio of the first echo signal and the signal-to-noise ratio of the second echo signal are relatively high, the first echo signal and the second echo signal are not combined. This saves a network resource.

605: The light detection and ranging determines whether a first direction and a second direction are located in a same target area, and if yes, executes step 606.

The light detection and ranging determines that the first direction in which the first echo signal is received is (x, y) and determines that the second direction in which the second echo signal is received is (x, y+1), and then determines whether the first direction (x, y) and the second direction (x, y+1) are located in a same target area, for example, the light detection and ranging determines whether the first direction (x, y) and the second direction (x, y+1) are both located in any one of the target area 1 to the target area 6 shown in FIG. 7. When the light detection and ranging determines that the first direction (x, y) and the second direction (x, y+1) are both located in any one of the target area 1 to the target area 6, the light detection and ranging determines that the first direction (x, y) and the second direction (x, y+1) are located in a same target area.

It may be understood that, when the first direction (x, y) and the second direction (x, y+1) are located in different target areas of the target area 1 to the target area 6, the light detection and ranging determines that the first direction (x, y) and the second direction (x, y+1) are not located in a same target area, and the light detection and ranging does not execute subsequent steps. This clearly saves a network resource.

606: The light detection and ranging separately performs noise reduction processing on the first echo signal and the second echo signal.

After the light detection and ranging determines that the first direction (x, y) of the first echo signal and the second direction (x, y+1) of the second echo signal are located in a same target area, the light detection and ranging separately performs noise reduction processing on the first echo signal and the second echo signal, to reduce interference caused by noise for the echo signals.

A noise reduction processing method provided in this embodiment may include any one or several of matched filtering, Gaussian filtering, wavelet domain denoising, and frequency domain filtering. Certainly, the noise reduction processing method provided in this embodiment may alternatively include another method. This is not limited herein.

607: The light detection and ranging determines a first inflection point and a second inflection point.

Figure 8:
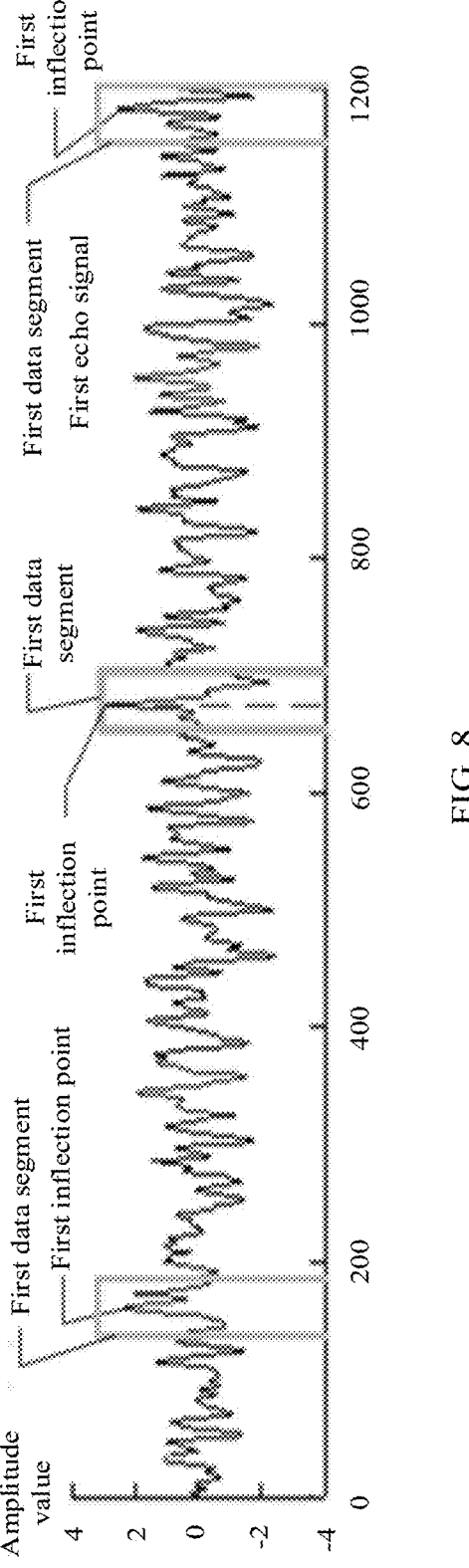
FIG. 8 is a schematic diagram of another embodiment according to an embodiment of this application.

The light detection and ranging determines the first inflection point from the first echo signal. Further, the light detection and ranging determines that the received first echo signal is $r_{x,y}(n)$, where n is a quantity of sampling points of the first echo signal, the light detection and ranging sorts n sampling points of the first echo signal $r_{x,y}(n)$ in descending order based on amplitude values, and determines to use, as a first inflection point set, a sequence of the n sampling points sorted in descending order based on the amplitude values, and the light detection and ranging uses, as first inflection points, N sampling points ranked first in the first inflection point set. For example, as shown in FIG. 8, when N is 3, the first inflection points may be shown in FIG. 8. It should be noted that, in this embodiment, N is an integer greater than or equal to 1.

Figure 9:
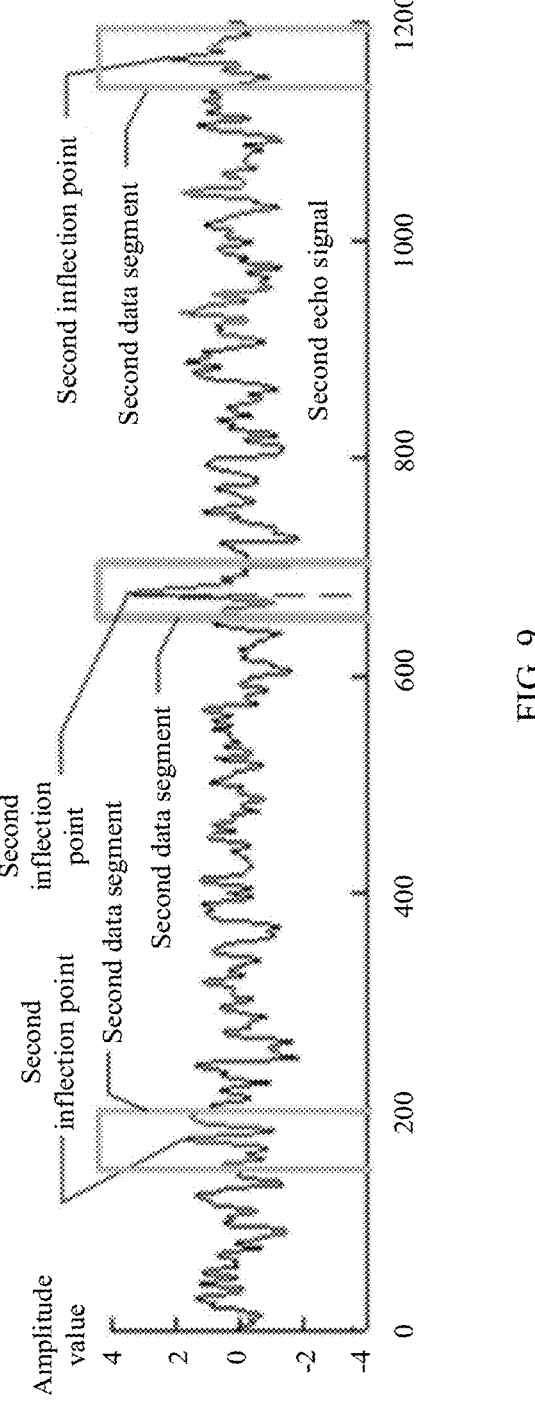
FIG. 9 is a schematic diagram of another embodiment according to an embodiment of this application.

In this embodiment, determining, by the light detection and ranging, the second inflection point from the second echo signal is similar to the determining the first inflection point from the first echo signal. Further, referring to FIG. 9, the light detection and ranging determines that the received second echo signal is $r_{x,y+1}(n)$, where a quantity of sampling points of the second echo signal may also be n, the light detection and ranging sorts n sampling points of the second echo signal $r_{x,y+1}(n)$ in descending order based on amplitude values, and determines to use, as a second inflection point set, a sequence of the n sampling points sorted in descending order based on the amplitude values, and the light detection and ranging uses, as second inflection points, N sampling points ranked first in the second inflection point set. For example, as shown in FIG. 9, when N is 3, the second inflection points may be shown in FIG. 9.

608: The light detection and ranging determines a first data segment and a second data segment.

Referring to FIG. 8, after determining the first inflection point, the light detection and ranging combines the first inflection point and P sampling points adjacent to the first inflection point into the first data segment. The first data segment may be represented as $w_{x,y,i}(k)$, where $0<k\leq P$, $0<i\leq N$, k is a sampling point of the first data segment, i is an $i^{th}$ data segment of first data segments, and P is an integer greater than or equal to 1. For example, as shown in FIG. 8, when there are three first inflection points, the light detection and ranging truncates a total of 50 sampling points on two sides of each of the first inflection points as the first data segment by using the first inflection point as a center, and the first data segment may be shown in FIG. 8. Certainly, the light detection and ranging may alternatively truncate P sampling points on one side of the first inflection point as the first data segment. This is not limited herein.

In this embodiment, a method for determining the second data segment by the light detection and ranging is similar to the method for determining the first data segment. For details, refer to FIG. 9. The second data segment may be represented as $w_{x,y+1,j}(k)$, where $0 < k \le P$, $0 < j \le N$, k is a sampling point of the second data segment, and j is a $j^{th}$ data segment of second data segments. Details are not described.

609: The light detection and ranging determines a first moment $t_{(x,y)}(i)$ at which the first inflection point is received and a second moment $t_{(x,y+1)}(j)$ at which the second inflection point is received.

In this embodiment, the first moment $t_{(x,y)}(i)$ may be understood as a receive moment of a first inflection point in the $i^{th}$ data segment of the first data segments, and the second moment $t_{(x,y+1)}(j)$ may be understood as a receive moment of a second inflection point in the $j^{th}$ data segment of the second data segments.

610: The light detection and ranging determines whether a time difference between the first moment $t_{(x,y)}(i)$ and the second moment $t_{(x,y+1)}(j)$ is less than a first preset threshold, and if yes, executes step 611.

In this embodiment, the light detection and ranging may determine, by using formula (6-1), whether the time difference between the first moment $t_{(x,y)}(i)$ and the second moment $t_{(x,y+1)}(j)$ is less than the first preset threshold:

$$|t_{(x,y)}(i) - t_{(x,y+1)}(j)| \le thr. \qquad (6-1)$$

In formula (6-1), thr is the first preset threshold.

For example, when a first moment of a first inflection point in the first data segment $w_{x,y,1}(k)$ of the first data segments $w_{x,y,i}(k)$ is $t_{(x,y)}(1)$, and a second moment of a second inflection point in the first data segment $w_{x,y+1,1}(k)$ of the second data segments $w_{x,y+1,j}(k)$ is $t_{(x,y+1)}(1)$, the light detection and ranging determines whether $|t_{(x,y)}(1) - t_{(x,y+1)}(1)|$ is less than or equal to thr. For example, when $t_{(x,y)}(1)$ is 175, $t_{(x,y+1)}(1)$ is 176, and thr is 2, the light detection and ranging determines the time difference between the first moment $t_{(x,y)}(1)$ and the second moment $t_{(x,y+1)}(1)$ is less than the first preset threshold.

611: The light detection and ranging combines the first data segment and the second data segment.

When the time difference between the first moment $t_{(x,y)}(i)$ and the second moment $t_{(x,y+1)}(j)$ is less than the first preset threshold, the light detection and ranging combines the first data segment $w_{x,y,i}(k)$ and the second data segment $w_{x,y,i}(k)$.

In this embodiment, the light detection and ranging may combine the first data segment and the second data segment by using formula (6-2), to obtain $w_{x,y,f}(k)$, where f is an $f^{th}$ data segment:

$$w_{x,y,f}(k) = w_{x,y,i}(k) + w_{x,y+1,j}(k). \qquad (6-2)$$

Further, the light detection and ranging sequentially compares first moments $t_{(x,y)}(i)$ of first inflection points in $i^{th}$ data segments $w_{x,y,i}(k)$ of the first data segments with second moments $t_{(x,y)}(i)$ of second inflection points in $j^{th}$ data segments $w_{x,y,j}(k)$ of the second data segments, and combines data segments that meet the condition shown in formula (3-1). For example, when the first moment $t_{(x,y)}(1)$ of the first data segment $w_{x,y,1}(k)$ of the first data segments is 175, the second moment $t_{(x,y+1)}(1)$ of the first data segment $w_{x,y+1,1}(k)$ of the second data segments is 176, and the first preset threshold thr is 2, the light detection and ranging determines, by using formula (6-1), that $|t_{(x,y)}(1) - t_{(x,y+1)}(1)|$ is less than or equal to thr, and then the light detection and ranging combines the first data segment $w_{x,y,i}(k)$ and the first data segment $w_{x,y+1,1}(k)$ by using formula (6-2), to obtain $w_{x,y,1}(k)$. Alternatively, the light detection and ranging may compare the first moment $t_{(x,y)}(1)$ of the first data segment $w_{x,y,1}(k)$ of the first data segments with a second moment of a second inflection point in another data segment of the second data segments, for example, compare the first moment $t_{(x,y)}(1)$ with a second moment $t_{(x,y+1)}(2)$, and if a difference between the first moment $t_{(x,y)}(1)$ and the second moment $t_{(x,y+1)}(2)$ is less than 2, $w_{x,y,1}(k)$ and $w_{x,y+1,2}(k)$ are also combined.

In this embodiment, the combining, by the light detection and ranging, $w_{x,y,1}(k)$ and $w_{x,y+1,2}(k)$ may also mean adding an amplitude value of a sampling point S in $w_{x,y,1}(k)$ and an amplitude value of a sampling point S in $w_{x,y+1,2}(k)$, or adding an amplitude value of a sampling point S in $w_{x,y,i}(k)$ and an amplitude value of a sampling point S+d in $w_{x,y+1,2}(k)$, where d is a distance between the sampling point of a first inflection point in $w_{x,y,i}(k)$ and the sampling point of a second inflection point in $w_{x,y+1,2}(k)$. It should be noted that the amplitude value in this embodiment may be an amplitude value of a level signal. Further, combining $w_{x,y,i}(k)$ and $w_{x,y+1,2}(k)$ is similar to the combining the first echo signal and the second echo signal in step 306. Details are not described herein.

612 The light detection and ranging calculates a distance between the target object and the light detection and ranging.

The light detection and ranging determines, as a peak point $n_{max}$, a sampling point with a largest amplitude value in a signal obtained after the first data segment and the second data segment are obtained, and determines, as a third moment, a sampling time corresponding to the peak point $n_{max}$, and then determines TOF based on the third moment, and calculates the distance R between the target object and the light detection and ranging based on the TOF and a speed of light c by using formula (2-1):

$$R = \frac{ct}{2}.$$

Clearly, the distance is calculated by using the third moment corresponding to the peak point $n_{max}$ with a relatively high signal-to-noise ratio, thereby improving accuracy of calculating the distance between the target object and the light detection and ranging.

It should be noted that, in this embodiment, the light detection and ranging may determine the third moment by using the peak point $n_{max}$, or may determine the third moment by using another method. For example, the light detection and ranging may determine the third moment by using a method such as a rising edge, a constant fraction discriminator (CFD), or a center of gravity. This is not limited herein.

It may be understood that, in this application, the light detection and ranging may alternatively determine a reflectivity and an amplitude by using the signal obtained after the first data segment and the second data segment are combined. Details are not described herein.

It should be noted that, in this embodiment, step 601, step 604, step 605, step 606, and step 612 are optional steps, and may or may not be executed in actual application.

In this embodiment, the light detection and ranging determines the first inflection point from the first inflection point set, and determines the second inflection point from the second inflection point set, and when the time difference between the first moment at which the first inflection point is received and the second moment at which the second inflection point is received is less than the first preset threshold, combines the first data segment obtained based on the first inflection point and the second data segment obtained based on the second inflection point. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of the combined signal can be improved by combining the first echo signal and the second echo signal that are reflected by the same target object.

The foregoing describes the echo signal processing method provided in the embodiments of this application, and the following describes another echo signal processing method provided in the embodiments of this application.

FIG. 10 is a schematic block diagram of another echo signal processing method according to an embodiment of this application. As shown in FIG. 10, the echo signal processing method may include the following steps.

1001: A transmitter transmits echo signals.

1002: A receiver receives echo signals.

In this embodiment, step 1001 and step 1002 are similar to step 301 and step 302 in the embodiment corresponding to FIG. 3. Details are not described herein again.

1003: Light detection and ranging determines whether a signal-to-noise ratio of a first echo signal is less than a second preset threshold, and determines whether a signal-to-noise ratio of a second echo signal is less than a third preset threshold.

In this embodiment, step 1003 is similar to step 604 in the embodiment corresponding to FIG. 6. Details are not described herein again.

1004: The light detection and ranging determines whether a first direction and a second direction are located in a same target area, and if yes, executes step 1005.

Figure 12:
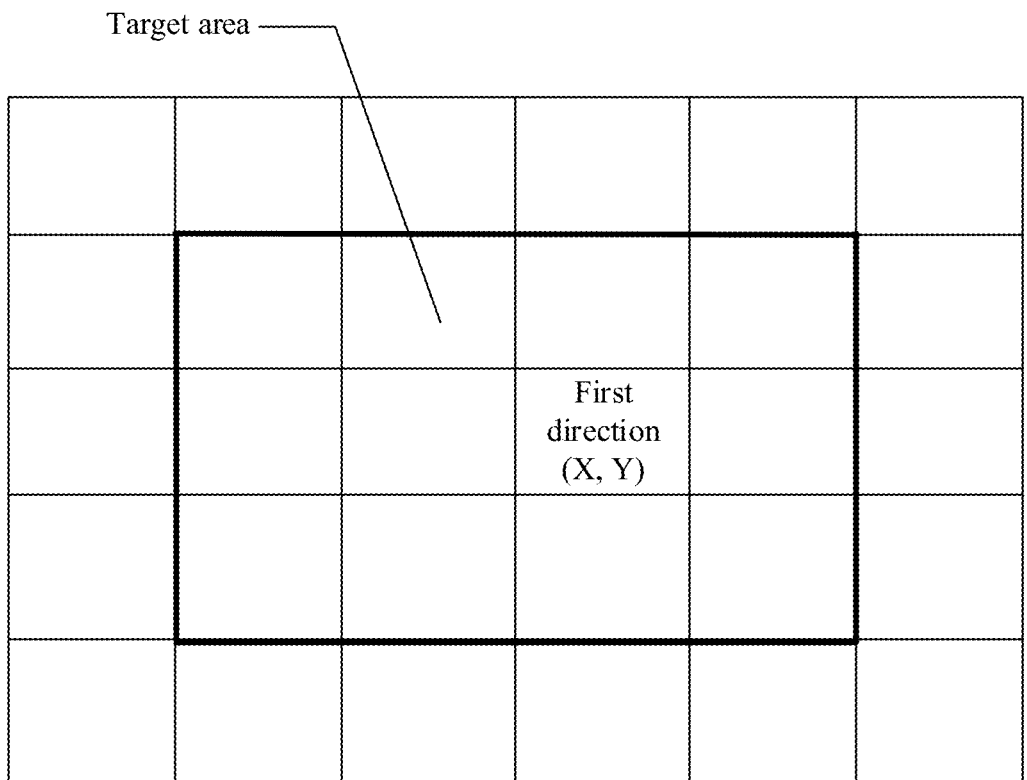
FIG. 12 is a schematic diagram of another embodiment according to an embodiment of this application.

The light detection and ranging receives the first echo signal, and determines the first direction (x, y) in which the first echo signal is received, where an area in which the first direction (x, y) is located may be shown in FIG. 11, and the light detection and ranging combines the first direction (x, y) and a neighboring area of the first direction (x, y) into a target area. It may be understood that, in this embodiment, the neighboring area of the first direction (x, y) may be an area directly adjacent to the first direction (x, y), as shown in FIG. 11, or may be an area indirectly adjacent to the first direction (x, y), as shown in FIG. 12. This is not limited herein.

The light detection and ranging receives the second echo signal, determines the second direction (x, y+1) in which second echo signal is received, and determines whether the first direction (x, y) and the second direction (x, y+1) are located in a same target area. For example, the light detection and ranging determines whether the second direction (x, y+1) is located in a target area shown in FIG. 11 or FIG. 12. When determining that the second direction (x, y+1) is located in the target area shown in FIG. 11 or FIG. 12, the light detection and ranging determines that the first direction (x, y) and the second direction (x, y+1) are located in a same target area.

It may be understood that, when determining that the second direction (x, y+1) is not located in the target area shown in FIG. 11 or FIG. 12, the light detection and ranging determines that the first direction (x, y) and the second direction (x, y+1) are not located in a same target area, and does not execute subsequent steps. This clearly saves a network resource.

1005: The light detection and ranging separately performs noise reduction processing on the first echo signal and the second echo signal.

1006: The light detection and ranging determines a first inflection point and a second inflection point.

1007: The light detection and ranging determines a first data segment and a second data segment.

1008: The light detection and ranging determines a first moment $t_{(x,y)}(i)$ at which the first inflection point is received and a second moment $t_{(x,y+1)}(j)$ at which the second inflection point is received.

1009: The light detection and ranging determines whether a time difference between the first moment $t_{(x,y)}(i)$ and the second moment $t_{(x,y+1)}(j)$ is less than a first preset threshold, and if yes, executes step 1010.

1010: The light detection and ranging combines the first data segment and the second data segment.

1011: The light detection and ranging calculates a distance between a target object and the light detection and ranging.

In this embodiment, step 1005 to step 1011 are similar to step 606 to step 6012 in the embodiment corresponding to FIG. 6. Details are not described herein again.

It should be noted that, in this embodiment, step 1003, step 1004, step 1005, and step 1011 are optional steps, and may or may not be executed in actual application.

In this embodiment, the light detection and ranging determines the first inflection point from a first inflection point set, and determines the second inflection point from a second inflection point set, and when the time difference between the first moment at which the first inflection point is received and the second moment at which the second inflection point is received is less than the first preset threshold, combines the first data segment obtained based on the first inflection point and the second data segment obtained based on the second inflection point. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of a combined signal can be improved by combining the first echo signal and the second echo signal that are reflected by the same target object.

The foregoing describes the echo signal processing method provided in the embodiments of this application, and the following describes another echo signal processing method provided in the embodiments of this application.

FIG. 13 is a schematic block diagram of another echo signal processing method according to an embodiment of this application. As shown in FIG. 13, the echo signal processing method may include the following steps.

1301: Light detection and ranging divides a picture corresponding to an FOV into a plurality of target areas.

1302: A transmitter transmits echo signals.

1303: A receiver receives echo signals.

1304: The light detection and ranging determines whether a signal-to-noise ratio of a first echo signal is less than a second preset threshold, and determines whether a signal-to-noise ratio of a second echo signal is less than a third preset threshold.

1305: The light detection and ranging determines whether a first direction and a second direction are located in a same target area, and if yes, executes step 1306.

1306: The light detection and ranging separately performs noise reduction processing on the first echo signal and the second echo signal.

In this embodiment, step 1301 to step 1306 are similar to step 601 to step 606 in the embodiment corresponding to FIG. 6. Details are not described herein again.

1307: The light detection and ranging determines a first data segment from the first echo signal, and determines a second data segment from the second echo signal.

The light detection and ranging determines the first data segment from the first echo signal. Further, the light detection and ranging may truncate M data segments from the first echo signal according to a preset rule, and determines an energy value of each of the M data segments, the light detection and ranging sorts the M data segments in descending order based on energy values, and determines, as a first data segment set, a sequence obtained by sorting the M data segments in descending order based on the energy values, and the light detection and ranging uses, as first data segments, Z data segments ranked first in the first data segment set, where M and Z are both integers greater than or equal to 1.

The light detection and ranging determines the second data segment from the second echo signal. Determining, by the light detection and ranging, the second data segment from the second echo signal is similar to determining, by the light detection and ranging, the first data segment from the first echo signal. Details are not described herein.

It may be understood that the capability value of each data segment may be a sum of amplitude values of all sampling points of each data segment.

1308: The light detection and ranging determines a first inflection point and a second inflection point.

The light detection and ranging determines the first inflection point from the first data segment. The first inflection point is a sampling point in the first data segment, and amplitude values of left and right neighboring sampling points of the first inflection point are both less than an amplitude value of the first inflection point.

The light detection and ranging determines the second inflection point from the second data segment. The second inflection point is a sampling point in the second data segment, and amplitude values of left and right neighboring sampling points of the second inflection point are both less than an amplitude value of the second inflection point.

1309: The light detection and ranging determines a first moment $t_{(x,y)}(i)$ at which the first inflection point is received and a second moment $t_{(x,y+1)}$ (j) at which the second inflection point is received.

1310: The light detection and ranging determines whether a time difference between the first moment $t_{(x,y)}(i)$ and the second moment $t_{(x,y+1)}$ (j) is less than a first preset threshold, and if yes, executes step 1311.

1311: The light detection and ranging combines the first data segment and the second data segment.

1312: The light detection and ranging calculates a distance between a target object and the light detection and ranging.

In this embodiment, step 1309 to step 1312 are similar to step 609 to step 612 in the embodiment corresponding to FIG. 6. Details are not described herein again.

It should be noted that, in this embodiment, step 1301, step 1304, step 1305, step 1306, and step 1312 are optional steps, and may or may not be executed in actual application.

In this embodiment, the light detection and ranging determines the first inflection point from the first data segment, and determines the second inflection point from the second data segment, and when the time difference between the first moment at which the first inflection point is received and the second moment at which the second inflection point is received is less than the first preset threshold, combines the first data segment and the second data segment. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of a combined signal can be improved by combining the first echo signal and the second echo signal that are reflected by the same target object.

The foregoing describes the echo signal processing method provided in the embodiments of this application, and the following describes another echo signal processing method provided in the embodiments of this application.

FIG. 14 is a schematic block diagram of another echo signal processing method according to an embodiment of this application. As shown in FIG. 14, the echo signal processing method may include the following steps.

1401: A transmitter transmits echo signals.

1402: A receiver receives echo signals.

1403: Light detection and ranging determines whether a signal-to-noise ratio of a first echo signal is less than a second preset threshold, and determines whether a signal-to-noise ratio of a second echo signal is less than a third preset threshold.

1404: The light detection and ranging determines whether a first direction and a second direction are located in a same target area, and if yes, executes step 1405.

1405: The light detection and ranging separately performs noise reduction processing on the first echo signal and the second echo signal.

In this embodiment, step 1401 to step 1405 are similar to step 1001 to step 1005 in the embodiment corresponding to FIG. 10. Details are not described herein again.

1406: The light detection and ranging determines a first data segment from the first echo signal, and determines a second data segment from the second echo signal.

1407: The light detection and ranging determines a first inflection point and a second inflection point.

1408: The light detection and ranging determines a first moment $t_{(x,y)}(i)$ at which the first inflection point is received and a second moment $t_{(x,y+1)}$ (j) at which the second inflection point is received.

1409: The light detection and ranging determines whether a time difference between the first moment $t_{(x,y)}(i)$ and the second moment $t_{(x,y+1)}$ (j) is less than a first preset threshold, and if yes, executes step 1410.

1410: The light detection and ranging combines the first data segment and the second data segment.

1411: The light detection and ranging calculates a distance between a target object and the light detection and ranging.

In this embodiment, step 1406 to step 1411 are similar to step 1307 to step 1312 in the embodiment corresponding to FIG. 13. Details are not described herein again.

It should be noted that, in this embodiment, step 1403, step 1404, step 1405, and step 1411 are optional steps, and may or may not be executed in actual application.

In this embodiment, the light detection and ranging determines the first inflection point from the first data segment, and determines the second inflection point from the second data segment, and when the time difference between the first moment at which the first inflection point is received and the second moment at which the second inflection point is received is less than the first preset threshold, combines the first data segment and the second data segment. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of a combined signal can be improved by combining the first echo signal and the second echo signal that are reflected by the same target object.

The foregoing describes the echo signal processing method provided in the embodiments of this application, and the following describes an apparatus in the embodiments of this application.

Figure 15:
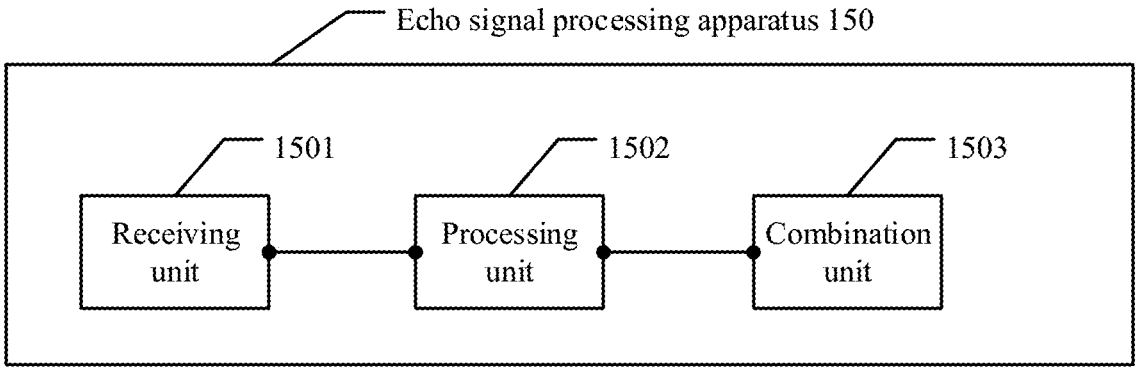
FIG. 15 is a schematic block diagram of an echo signal processing apparatus according to an embodiment of this application.

FIG. 15 is a schematic block diagram of an echo signal processing apparatus according to an embodiment of this application. The echo signal processing apparatus 150 may be light detection and ranging, and the echo signal processing apparatus 150 includes a receiving unit 1501 configured to receive at least two echo signals, where the at least two echo signals include a first echo signal and a second echo signal, and the first echo signal and the second echo signal are received in different directions, a processing unit 1502 configured to determine a first inflection point from the first echo signal, and determine a second inflection point from the second echo signal, where the first inflection point is a sampling point of the first echo signal, and amplitude values of left and right neighboring sampling points are less than an amplitude value of the first inflection point, and the second inflection point is a sampling point of the second echo signal, and amplitude values of left and right neighboring sampling point are less than an amplitude value of the second inflection point, where the processing unit 1502 is further configured to determine whether a time difference between a first moment at which the first inflection point is received from the first echo signal and a second moment at which the second inflection point is received from the second echo signal is less than a first preset threshold, and a combination unit 1503 configured to, when the time difference between the first moment at which the first inflection point is received from the first echo signal and the second moment at which the second inflection point is received from the second echo signal is less than the first preset threshold, combine the first echo signal and the second echo signal.

In a possible implementation, the processing unit 1502 is further configured to determine a first data segment from the first echo signal, and determine a second data segment from the second echo signal, where the first inflection point is included in the first data segment, and the second inflection point is included in the second data segment, and the combination unit is further configured to combine the first data segment and the second data segment.

In another possible implementation, the processing unit 1502 is further configured to determine, as the first data segment, a set of the first inflection point and P sampling points adjacent to the first inflection point, where P is an integer greater than or equal to 1, and the processing unit 1502 is further configured to determine, as the second data segment, a set of the second inflection point and P sampling points adjacent to the second inflection point.

In another possible implementation, the processing unit 1502 is further configured to determine a first inflection point set from the first echo signal, where the first inflection point is any one of the first N inflection points in the first inflection point set, the first inflection point set is a set of all inflection points of the first echo signal, and the inflection points in the first inflection point set are sorted in descending order based on amplitude values, and the processing unit 1502 is further configured to determine a second inflection point set from the second echo signal, where the second inflection point is any one of the first N inflection points in the second inflection point set, the second inflection point set is a set of all inflection points of the second echo signal, and the inflection points in the second inflection point set are sorted in descending order based on amplitude values.

In another possible implementation, the processing unit 1502 is further configured to truncate M data segments from the first echo signal to obtain a first data segment set, where the first data segment is the first Z data segments in the first data segment set, the M data segments truncated from the first echo signal are sorted in the first data segment set in descending order based on energy values of the data segments, and M and Z are both integers greater than or equal to 1, and the processing unit 1502 is further configured to truncate M data segments from the second echo signal to obtain a second data segment set, where the second data segment is the first Z data segments in the second data segment set, and the M data segments truncated from the second echo signal are sorted in the second data segment set in descending order based on energy values of the data segments.

In another possible implementation, the processing unit 1502 is further configured to determine that a first direction in which the first echo signal is received and a second direction in which the second echo signal is received are located in a same target area, and if yes, the processing unit 1502 is configured to determine whether the time difference between the first moment at which the first inflection point is received from the first echo signal and the second moment at which the second inflection point is received from the second echo signal is less than the first preset threshold.

In another possible implementation, the processing unit 1502 is further configured to divide an FOV corresponding to receiving the at least one echo signal into a plurality of target areas, where the FOV includes the target object.

In another possible implementation, the processing unit 1502 is further configured to determine, as the target area, the first direction in which the first echo signal is received and a neighboring area of the first direction in which the first echo signal is received.

In another possible implementation, the processing unit 1502 is further configured to determine a sampling point with a largest amplitude value from a signal obtained after the first echo signal and the second echo signal are combined, and determine a third moment corresponding to the sampling point with the largest amplitude value, and calculate, based on the third moment, a distance between the target object and a receive point that receives the first echo signal.

In another possible implementation, a signal-to-noise ratio of the first echo signal is less than a second preset threshold, and a signal-to-noise ratio of the second echo signal is less than a third preset threshold.

In another possible implementation, the processing unit 1502 is further configured to separately perform noise reduction processing on the first echo signal and the second echo signal, where the noise reduction processing includes at least one of matched filtering, Gaussian filtering, wavelet domain denoising, and frequency domain filtering.

In this embodiment, the processing unit 1502 determines the first inflection point from the first echo signal, and determines the second inflection point from the second echo signal, and when it is determined that the time difference between the first moment at which the receiving unit 1501 receives the first inflection point and the second moment at which the receiving unit 1501 receives the second inflection point is less than the first preset threshold, the combination unit 1503 combines the first echo signal and the second echo signal. Clearly, when the time difference between the first moment at which the first inflection point is received and the second moment at which the second inflection point is received is less than the first preset threshold, the light detection and ranging can determine that the received first echo signal and second echo signal are reflected by a same target object, and a signal-to-noise ratio of the combined signal can be improved by combining the first echo signal and the second echo signal that are reflected by the same target object.

The foregoing describes the echo signal processing apparatus provided in the embodiments of this application, and the following describes another echo signal processing apparatus provided in the embodiments of this application.

Figure 16:
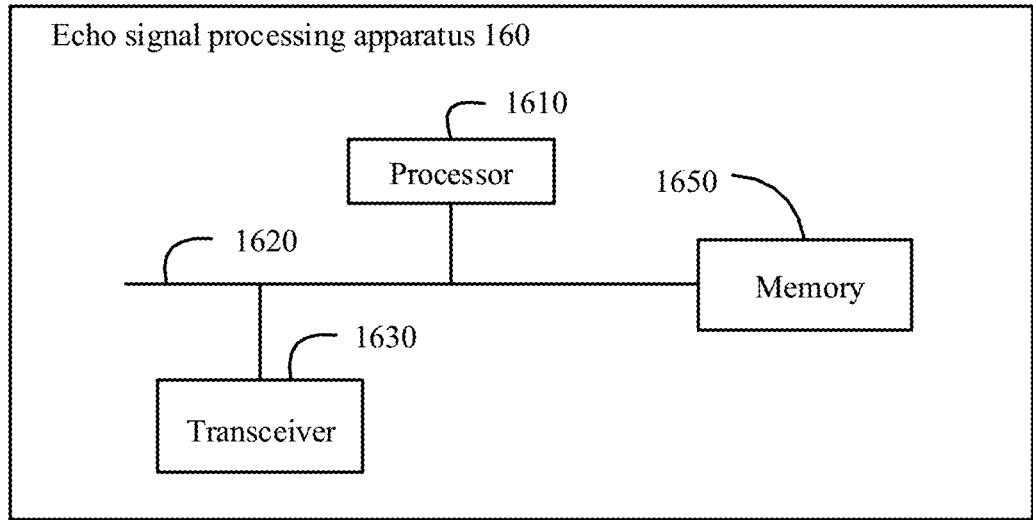
FIG. 16 is a schematic diagram of a hardware structure of an echo signal processing apparatus according to an embodiment of this application.

FIG. 16 is a schematic structural diagram of an echo signal processing apparatus according to an embodiment of this application. The echo signal processing apparatus 160 may be light detection and ranging, and the echo signal processing apparatus 160 includes at least one processor 1610, memory 1650, and transceiver 1630. The transceiver may include a receiver and a transmitter. The memory 1650 may include a read-only memory (ROM) and/or a random-access memory (RAM), and provide operation instructions and data for the processor 1610. A part of the memory 1650 may further include a non-volatile RAM (NVRAM).

In some implementations, the memory 1650 stores the following elements an executable module or a data structure, or a subset thereof, or an extended set thereof.

In this embodiment of this application, the operation instructions stored in the memory 1650 is invoked (the operation instructions may be stored in an operating system) to execute a corresponding operation. The processor 1610 controls an operation of the echo signal processing apparatus 160. The processor 1610 may also be referred to as a central processing unit (CPU). The memory 1650 may include a ROM and a RAM, and provide instructions and data to the processor 1610. A part of the memory 1650 may further include an NVRAM. In a specific application, components of the echo signal processing apparatus 160 are coupled together by using a bus system 1620. In addition to a data bus, the bus system 1620 may further include a power bus, a control bus, a status signal bus, and the like. However, for clear description, various types of buses in the figure are marked as the bus system 1620.

The methods disclosed in the embodiments of this application may be applied to the processor 1610, or implemented by the processor 1610. The processor 1610 may be an integrated circuit chip and has a signal processing capability. In an implementation process, steps in the foregoing methods can be implemented by using a hardware integrated logical circuit in the processor 1610, or by using instructions in a form of software. The processor 1610 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The processor 1610 may implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a RAM, a flash memory, a ROM, a programmable ROM (PROM), an electrically erasable PROM (EEPROM), or a register. The storage medium is located in the memory 1650. The memory 1650 may be a physically independent unit, or may be integrated into the processor 1610. The processor 1610 reads information from the memory 1650, and completes the steps of the methods in combination with hardware.

The transceiver 1630 in this embodiment may be configured to execute operation steps related to receiving and sending in the foregoing method embodiments, or data sending and receiving steps of an echo signal processing apparatus in another optional embodiment.

The processor 1610 may be configured to execute steps related to data processing in the foregoing method embodiments, or a data processing step of an echo signal processing apparatus in another optional embodiment.

It may be clearly understood by persons skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to execute all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. These modifications or replacements do not cause the essence of the corresponding technical solutions to depart from the spirit and scope of the technical solutions of the embodiments of this application.

What is claimed is:

1. An echo signal processing method implemented by a light detection and ranging (LiDAR) system, comprising:

receiving, in different directions, echo signals comprising a first echo signal and a second echo signal;

determining a first inflection point from the first echo signal, wherein the first inflection point is a first sampling point of the first echo signal, and wherein first amplitude values of a first left neighboring sampling point of the first inflection point and a first right neighboring sampling point of the first inflection point are less than a second amplitude value of the first inflection point;

determining a second inflection point from the second echo signal, wherein the second inflection point is a second sampling point of the second echo signal, and wherein third amplitude values of a second left neighboring sampling point of the second inflection point and a second right neighboring sampling point of the second inflection point are less than a fourth amplitude value of the second inflection point;

dividing, by a processor of the LiDAR system, a field of view (FOV) corresponding to receiving at least one echo signal into a plurality of target areas, wherein the FOV comprises a target object;

making a first determination that a first direction that the first echo signal is received and a second direction that the second echo signal is received are located in a same target area among the plurality of target areas;

separately performing, in response to the first determination, noise reduction processing on the first echo signal and the second echo signal, wherein the noise reduction processing comprises at least one of matched filtering, wavelet-domain denoising, or frequency-domain filtering;

making a second determination, in response to the first determination, that a time difference between a first moment when the first inflection point is received from the first echo signal and a second moment when the second inflection point is received from the second echo signal is less than or equal to a first preset threshold; and combining, in response to the second determination, the first echo signal and the second echo signal to obtain a combined signal.

2. The echo signal processing method of claim 1, further comprising:

determining a first data segment from the first echo signal, wherein the first inflection point is in the first data segment;

determining a second data segment from the second echo signal, wherein the second inflection point is in the second data segment; and combining the first data segment and the second data segment.

3. The echo signal processing method of claim 2, further comprising:

determining, as the first data segment, a first set of the first inflection point and P first sampling points adjacent to the first inflection point, wherein P is an integer greater than or equal to 1; and determining, as the second data segment, a second set of the second inflection point and P second sampling points adjacent to the second inflection point.

4. The echo signal processing method of claim 2, further comprising:

dividing the first echo signal into M first data segments to obtain a first data segment set, wherein the first data segment is one of first Z data segments in the first data segment set, wherein the M first data segments are in a descending order based on first amplitude values of the M first data segments, and wherein M and Z are both integers greater than or equal to 1; and dividing the second echo signal into M second data segments to obtain a second data segment set, wherein the second data segment is one of second Z data segments in the second data segment set, and wherein the M second data segments are in the descending order based on second amplitude values of the M second data segments.

5. The echo signal processing method of claim 1, comprising:

determining, from the first echo signal, a first inflection point set comprising first inflection points of the first echo signal, wherein the first inflection point is any one of first N inflection points in the first inflection point set, and wherein the first inflection points are in a descending order based on corresponding amplitude values of the first inflection points; and determining, from the second echo signal, a second inflection point set comprising second inflection points of the second echo signal, wherein the second inflection point is any one of first N inflection points in the second inflection point set, and wherein the second inflection points are in the descending order based on corresponding amplitude values of the second inflection points.

6. The echo signal processing method of claim 1, further comprising associating, in response to the first determination, the first echo signal and the second echo signal with a same target object.

7. The echo signal processing method of claim 1, further comprising controlling a microelectromechanical system (MEMS) micromirror to scan the FOV.

8. The echo signal processing method of claim 1, further comprising:

determining a third sampling point having a largest amplitude value from the combined signal;

determining a third moment corresponding to the third sampling point; and calculating, based on the third moment, a distance between the target object and a receive point that receives the first echo signal.

9. The echo signal processing method of claim 6, wherein before determining that the first direction and the second direction are located in the target area, the echo signal processing method further comprises determining the first direction and a neighboring area of the first direction as the target area.

10. The echo signal processing method of claim 1, wherein a first signal-to-noise ratio of the first echo signal is less than a second preset threshold, and wherein a second signal-to-noise ratio of the second echo signal is less than a third preset threshold.

11. The echo signal processing method of claim 1, wherein the noise reduction processing further comprises Gaussian filtering.

12. A light detection and ranging (LiDAR) system, comprising:
   a processor; and
   a non-transitory storage medium coupled to the processor and configured to store program instructions, wherein, when executed by the processor, the program instructions cause the apparatus to:
   receive, in different directions, echo signals comprising a first echo signal and a second echo signal;
   determine a first inflection point from the first echo signal, wherein the first inflection point is a first sampling point of the first echo signal, and wherein first amplitude values of a first left neighboring sampling point of the first inflection point and a first right neighboring sampling point of the first inflection point are less than a second amplitude value of the first inflection point;
   determine a second inflection point from the second echo signal, wherein the second inflection point is a second sampling point of the second echo signal, and wherein third amplitude values of a second left neighboring sampling point of the second inflection point and a second right neighboring sampling point of the second inflection point are less than a fourth amplitude value of the second inflection point;
   divide, by a processor of the LiDAR system, a field of view (FOV) corresponding to receiving at least one echo signal into a plurality of target areas, wherein the FOV comprises a target object;
   make a first determination that a first direction that the first echo signal is received and a second direction that the second echo signal is received are located in a same target area among the plurality of target areas;
   separately perform, in response to the first determination, noise reduction processing on the first echo signal and the second echo signal, wherein the noise reduction processing comprises at least one of matched filtering, wavelet-domain denoising, or frequency-domain filtering;
   make, in response to the first determination, a second determination that a time difference between a first moment when the first inflection point is received from the first echo signal and a second moment when the second inflection point is received from the second echo signal is less than or equal to a first preset threshold; and
   combine, in response to the second determination, the first echo signal and the second echo signal to obtain a combined signal.

13. The LiDAR system of claim 12, wherein the program instructions further cause the LiDAR system to:
   determine a first data segment from the first echo signal, wherein the first inflection point is in the first data segment;
   determine a second data segment from the second echo signal, wherein the second inflection point is in the second data segment; and
   combine the first data segment and the second data segment.

14. The LiDAR system of claim 12, wherein the program instructions further cause the LiDAR system to associate, in response to the first determination, the first echo signal and the second echo signal with a same target object.

15. The LiDAR system of claim 14, wherein the program instructions further cause the LiDAR system to determine the first direction and a neighboring area of the first direction as the target area.

16. The LiDAR system of claim 14, wherein the program instructions further cause the LiDAR system to control a microelectromechanical systems (MEMS) micromirror to scan the FOV.

17. The LiDAR system of claim 16, wherein the program instructions further cause the LiDAR system to:
   determine a third sampling point having a largest amplitude value from the combined signal;
   determine a third moment corresponding to the third sampling point; and
   determine, based on the third moment, a distance between the target object and a receive point that receives the first echo signal.

18. The LiDAR system of claim 12, wherein a first signal-to-noise ratio of the first echo signal is less than a second preset threshold, and wherein a second signal-to-noise ratio of the second echo signal is less than a third preset threshold.

19. The LiDAR system of claim 12, wherein the noise reduction processing further comprises Gaussian filtering.

20. A computer program product comprising computer-executable instructions stored on a non-transitory computer readable medium that, when executed by a processor, cause a light detection and ranging (LiDAR) system to:
   receive, in different directions, echo signals comprising a first echo signal and a second echo signal;
   determine a first inflection point from the first echo signal, wherein the first inflection point is a first sampling point of the first echo signal, and wherein first amplitude values of a first left neighboring sampling point of the first inflection point and a first right neighboring sampling point of the first inflection point are less than a second amplitude value of the first inflection point;
   determine a second inflection point from the second echo signal, wherein the second inflection point is a second sampling point of the second echo signal, and wherein third amplitude values of a second left neighboring sampling point of the second inflection point and a second right neighboring sampling point of the second inflection point are less than a fourth amplitude value of the second inflection point;
   divide, by a processor of the LiDAR system, a field of view (FOV) corresponding to receiving at least one echo signal into a plurality of target areas, wherein the FOV comprises a target object;
   make a first determination that a first direction that the first echo signal is received and a second direction that the second echo signal is received are located in a same target area among the plurality of target areas;

separately perform, in response to the first determination, noise reduction processing on the first echo signal and the second echo signal, wherein the noise reduction processing comprises at least one of matched filtering, wavelet-domain denoising, or frequency-domain filtering;

make, in response to the first determination, a second determination that a time difference between a first moment when the first inflection point is received from the first echo signal and a second moment when the second inflection point is received from the second echo signal is less than or equal to a preset threshold; and combine, in response to the second determination, the first echo signal and the second echo signal to obtain a combined signal.

* * * * *